(12) United States Patent
Lee et al.

(10) Patent No.: US 10,577,199 B2
(45) Date of Patent: Mar. 3, 2020

(54) ROBOT CLEANER, REFRIGERATOR, CONTAINER TRANSFER SYSTEM, AND METHOD OF TRANSFERRING AND RETRIEVING CONTAINER USING THE ROBOT CLEANER

(71) Applicant: Samsung Electronics Co., Ltd., Suwon-si (KR)

(72) Inventors: Sang Tak Lee, Hwaseong-si (KR); Sang Hak Kim, Hwaseong-si (KR); Bo Kyung Kim, Suwon-si (KR); Ji Ho Seo, Suwon-si (KR); Ho Jin Lee, Suwon-si (KR); Sang Hwa Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 310 days.

(21) Appl. No.: 15/665,954

(22) Filed: Aug. 1, 2017

(65) Prior Publication Data

US 2018/0029809 A1 Feb. 1, 2018

(30) Foreign Application Priority Data

Aug. 1, 2016 (KR) ........................ 10-2016-0097941

(51) Int. Cl.
*B65G 67/02* (2006.01)
*A47L 7/00* (2006.01)
(Continued)

(52) U.S. Cl.
CPC ................ *B65G 67/02* (2013.01); *A47L 5/22* (2013.01); *A47L 7/009* (2013.01); *A47L 7/0085* (2013.01);
(Continued)

(58) Field of Classification Search
CPC ..... B65G 67/02; A47L 9/2873; A47L 9/2857; A47L 9/2894; A47L 7/0085; A47L 9/009; A47L 5/22; A47L 9/0477; A47L 2201/02; A47L 2201/04; A47L 2400/20; A47L 7/009; A47L 9/2852; A47L 2201/022;
(Continued)

(56) References Cited

U.S. PATENT DOCUMENTS 5,179,843 A 1/1993 Cohausz
5,709,007 A * 1/1998 Chiang .................. A47L 5/225
15/329

(Continued)

FOREIGN PATENT DOCUMENTS

EP 0 470 513 A2 2/1992
KR 10-2006-0009058 1/2006
(Continued)

*Primary Examiner* — Michael Collins
(74) *Attorney, Agent, or Firm* — Staas & Halsey LLP

(57) ABSTRACT

Disclosed are a robot cleaner, a refrigerator, a container transfer system, and a method of transferring and retrieving a container using the robot cleaner. The method of transferring a container include returning a robot cleaner to a position guide device installed at a refrigerator, mounting the robot cleaner on the position guide device, transferring, by the refrigerator, a container built in the refrigerator to mount the container on the robot cleaner, and moving the robot cleaner on which the container is mounted to a target position.

20 Claims, 38 Drawing Sheets

(51) Int. Cl.
  *A47L 9/00* (2006.01)
  *F25D 23/12* (2006.01)
  *A47L 9/04* (2006.01)
  *F25D 11/00* (2006.01)
  *F25D 25/00* (2006.01)
  *A47L 9/28* (2006.01)
  *A47L 5/22* (2006.01)

(52) U.S. Cl.
  CPC ............ *A47L 9/009* (2013.01); *A47L 9/0477* (2013.01); *A47L 9/2852* (2013.01); *A47L 9/2857* (2013.01); *A47L 9/2873* (2013.01); *A47L 9/2894* (2013.01); *F25D 11/00* (2013.01); *F25D 23/12* (2013.01); *F25D 25/005* (2013.01); *A47L 2201/02* (2013.01); *A47L 2201/022* (2013.01); *A47L 2201/04* (2013.01); *F25D 2400/20* (2013.01)

(58) Field of Classification Search
  CPC ........ F25D 11/00; F25D 25/005; F25D 23/12; F25D 2400/20
  USPC .................................................. 700/231–244
  See application file for complete search history.

(56) References Cited

U.S. PATENT DOCUMENTS

| | | | | |
|---|---|---|---|---|
| 7,894,939 | B2* | 2/2011 | Zini | G05B 19/41895 700/245 |
| 8,736,228 | B1* | 5/2014 | Freed | H02J 7/0044 320/115 |
| 8,886,390 | B2* | 11/2014 | Wolfe | G06F 17/00 701/29.1 |
| 9,008,827 | B1* | 4/2015 | Dwarakanath | G06Q 10/087 700/213 |
| 10,317,119 | B2* | 6/2019 | Zou | F25B 49/00 |
| 2012/0109378 | A1* | 5/2012 | Kim | F25D 11/00 700/259 |
| 2016/0236867 | A1* | 8/2016 | Brazeau | B65G 1/1378 |
| 2017/0343256 | A1* | 11/2017 | Koch | F25B 39/022 |
| 2018/0360285 | A1* | 12/2018 | Erkek | A47L 9/28 |

FOREIGN PATENT DOCUMENTS

| | | |
|---|---|---|
| KR | 10-2009-0074933 | 7/2009 |
| KR | 10-2010-0064583 | 6/2010 |

* cited by examiner

ROBOT CLEANER, REFRIGERATOR, CONTAINER TRANSFER SYSTEM, AND METHOD OF TRANSFERRING AND RETRIEVING CONTAINER USING THE ROBOT CLEANER

CROSS-REFERENCE TO RELATED APPLICATION

This application claims the benefit of Korean Patent Application No. 10-2016-0097941, filed on Aug. 1, 2016 in the Korean Intellectual Property Office, the disclosure of which is incorporated herein by reference.

BACKGROUND

1. Field

Embodiments relate to a robot cleaner, a refrigerator, a container transfer system, and a method of transferring and retrieving a container using the robot cleaner.

2. Description of the Related Art

A robot cleaner that automatically cleans a space to be cleaned by suctioning foreign substances such as dust accumulated on the floor and the like while on the move over the space performs a cleaning operation by moving over the space according to an operation of a user or a predefined movement pattern. The robot cleaner may automatically move based on the predefined pattern, may move by sensing an external obstruction with a sensor and using the sensed information, or may move according to a signal transmitted from a remote controller operated by the user.

A refrigerator is an apparatus capable of storing items to be stored such as food, medications or the like at a certain temperature or less and is variously used at home or industrial sites. The refrigerator includes a storage compartment in which items to be stored are stored and a cooling device that maintains the storage compartment at a certain temperature or less and may keep the items to be stored refrigerated or frozen at a certain temperature or less. The refrigerator may maintain a temperature of the storage compartment at or below a level desired by a user by repeatedly evaporating and compressing a refrigerant. For this, the refrigerator may include an evaporator, a compressor, a condenser, and an expansion valve.

SUMMARY

It is an aspect to provide a robot cleaner, a refrigerator, a container transfer system, and a method of transferring and retrieving a container using the robot cleaner, capable of improving user convenience by transferring a container stored in a container storage device such as the refrigerator to a user and allowing the container storage device to retrieve the container.

A method of transferring a container includes: returning of a robot cleaner to a position guide device installed at a refrigerator; mounting of the robot cleaner on the position guide device; transferring a container built in the refrigerator by the refrigerator to mount the container on the robot cleaner; and moving of the robot cleaner on which the container is mounted to a target position.

The method may further include moving of the position guide device stored in a bottom end of the refrigerator to be exposed outside the refrigerator.

The position guide device may be movable forward or backward by a position guide device transferer provided at a bottom end portion of the refrigerator.

The position guide device transferer may include a rack, a rotor that moves along the rack, and a position guide device driver that generates a driving force with respect to the rotor.

The method may further include automatically opening of a door of the refrigerator.

The transferring of the container built in the refrigerator by the refrigerator to mount the container on the robot cleaner may comprise moving of a container mounter on which the container is mounted to a top end of the robot cleaner by a container transferer and separating of the container from the container mounter.

The container may include a mounted portion, and the container mounter includes a mounting member on or from which the mounted portion is mountable or separable.

The container transferer may include at least one pivoting member pivotably coupled with the container mounter and a driver that rotates the pivoting member in at least one direction.

The method may further include receiving of a container transfer command by a terminal device.

The method may further include: transferring of the container transfer command to a device using the position guide device; and transmitting a control signal corresponding to the container transfer command to at least one of the robot cleaner and the refrigerator by the position guide device.

The method may further include transmitting information on a position of the terminal device with the container transfer command by the terminal device, wherein the moving of the robot cleaner on which the container is mounted to the target position may include setting the position of the terminal device to be the target position and moving of the robot cleaner to the set target position.

The moving of the robot cleaner on which the container is mounted to the target position may include performing communication with a terminal device by the robot cleaner and moving of the robot cleaner following the terminal device according to a communication result with the terminal device.

A method of retrieving a container includes: returning of a robot cleaner on which a container is mounted to a position guide device installed at a refrigerator; mounting of the robot cleaner on the position guide device; and retrieving and storing the container mounted on the robot cleaner by the refrigerator.

The method may further include: forward moving of the robot cleaner mounted on the position guide device; automatically opening a door of the refrigerator; and backward moving of the robot cleaner corresponding to a forward movement distance and remounting of the robot cleaner on the position guide device.

The method may further include moving of the position guide device stored in the refrigerator to be exposed outside the refrigerator.

A container transfer system includes: a robot cleaner; a position guide device provided to allow the robot cleaner to be mounted thereon; and a refrigerator that mounts a container built therein on the robot cleaner when the robot cleaner is mounted on the position guide device, wherein the position guide device moves from a bottom end of the refrigerator to be stored in the refrigerator or to be exposed outside the refrigerator.

The refrigerator may include a position guide device transferer that is provided at a bottom end of the refrigerator and transfers the position guide device forward or backward.

The position guide device transferer may include a rack, a rotor that moves along the rack, and a position guide device driver that generates a driving force with respect to the rotor.

The refrigerator may include a container mounter on or from which the container is mounted or separated and a container transferer that transfers the container mounter.

The container transfer system may further include a terminal device that transmits at least one of a container transfer command and a container retrieval command to at least one of the robot cleaner, the position guide device, and the refrigerator.

A robot cleaner includes: a container mounter of which a container is mounted on the top; a driving wheel configured to move the robot cleaner to a location on which the container is mounted; and a controller configured to control the driving wheel for returning to a position guide device according to a container transfer command and moving the robot cleaner to a target position if the container is mounted on the container mounter.

A refrigerator includes: a position guide device transferer configured to transfer a position guide device; a door configured to be opened automatically when the position guide device is exposed in front of the refrigerator; and a container provider configured to transfer the container to outside after the door is opened.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Hereinafter, referring to FIGS. 1 to 18, a mobile body, a container storage device, and a container transfer system including the same according to one embodiment will be described.

Figure 1:
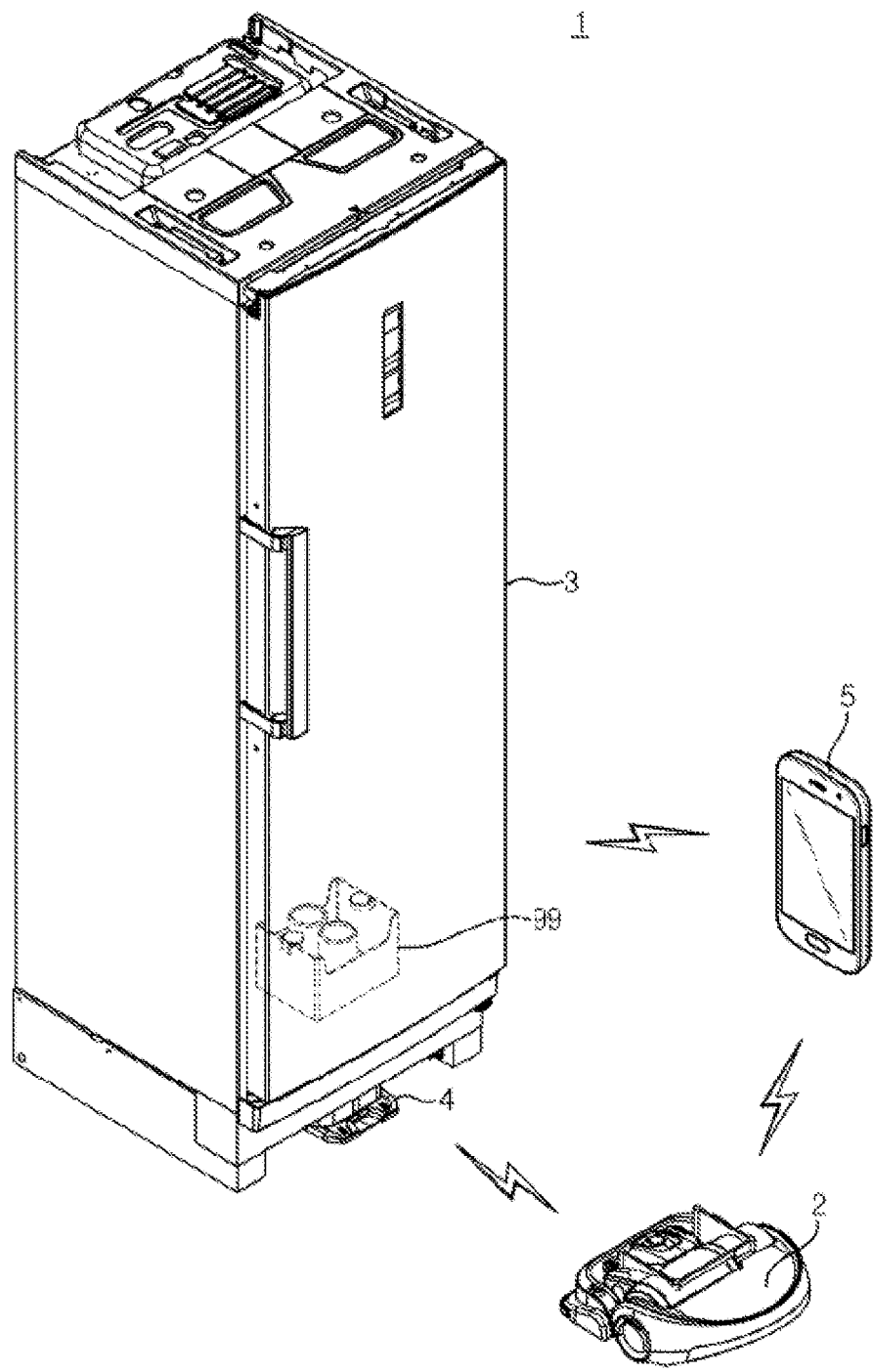
FIG. 1 is a conceptual view illustrating one example of a refrigerator container transfer system.

FIG. 1 is a conceptual view illustrating one example of a refrigerator container transfer system.

As shown in FIG. 1, a refrigerator container transfer system 1 may include a mobile body 2 provided to be movable and a container storage device 3 that provides a container 99 to the mobile body 2 and may further include a position guide device 4 on which the mobile body 2 is mountable as necessary. Also, depending on embodiments, the refrigerator container transfer system 1 may further include a terminal device 5.

The mobile body 2 is provided to move according to control of a user or predefined settings. The mobile body 2 is provided to stop in one direction of the container storage device 3 and to allow the container 99 provided by the container storage device 3 to be mounted thereon. According to one embodiment, the mobile body 2 may include various apparatuses movable indoor or outdoor such as a robot cleaner, a vehicle, a cart and the like.

The container storage device 3 stores the container 99 and provides the container 99 to the mobile body 2. The container storage device 3 may include various apparatuses such as a refrigerator, a kimchi fridge, dressers, racks and the like, capable of allowing the container 99 to be mounted thereon and allowing means capable of providing the container 99 to the mobile body 2 to be installed therein as necessary.

The position guide device 4 is provided to guide a container mounting position of the mobile body 2. The position guide device 4 may be designed to allow the mobile body 2 to be mounted thereon. The position guide device 4 may be installed in one direction of the container storage device 3. In this case, the position guide device 4 may be provided to be fixedly installed at a certain position in one direction of the container storage device 3 or to be movable to the certain position in one direction of the container storage device 3. When the mobile body 2 is a robot cleaner, the position guide device 4 may be a charger for charging the robot cleaner.

The terminal device 5 is provided to receive a command with respect to at least one of the mobile body 2, the container storage device 3, and the position guide device 4 from a user and to control at least one of the mobile body 2, the container storage device 3, and the position guide device 4 based on the received command. According to one embodiment, the terminal device 5 may control the mobile body 2, the container storage device 3, and the position guide device 4 by transmitting a control signal to each thereof. According to another embodiment, the terminal device 5 may allow the mobile body 2, the container storage device 3, and the position guide device 4 to perform a certain operation by transmitting a control signal to any one thereof. In this case, any one of the mobile body 2, the container storage device 3, and the position guide device 4 may receive a control signal and generate and transmit a control signal corresponding to the received control signal to other devices to allow the other devices to perform certain operations.

The terminal device 5 may be embodied using a portable communication device such as a laptop computer, a desktop computer, a smart phone, a cellular phone, a tablet personal computer, a portable game machine, and a personal digital assistant (PDA). Also, the terminal device 5 may include a remote controller separately manufactured to control the mobile body 2, the container storage device 3, the position guide device 4 and the like.

At least two of the mobile body 2, the container storage device 3, the position guide device 4, and the terminal device 5 may be provided to be mutually communicable using at least one of wired communication technology and wireless communication technology. In this case, the wired communication technology may be embodied using, for example, various cables such as a pair cable, a coaxial cable, an optical fiber cable, an Ethernet cable and the like. The wireless communication technology may be, for example, embodied using based on short-range communication technology such as wireless fidelity (Wi-Fi), Zigbee, or the like or may be embodied based on mobile communication technology embodied using various mobile communication standards such as 3GPP, 3PP2, Wi-max series, or the like.

Hereinafter, the container transfer system will be described with an example in which the mobile body 2 is a robot cleaner and the container storage device 3 is a refrigerator.

Figure 2:
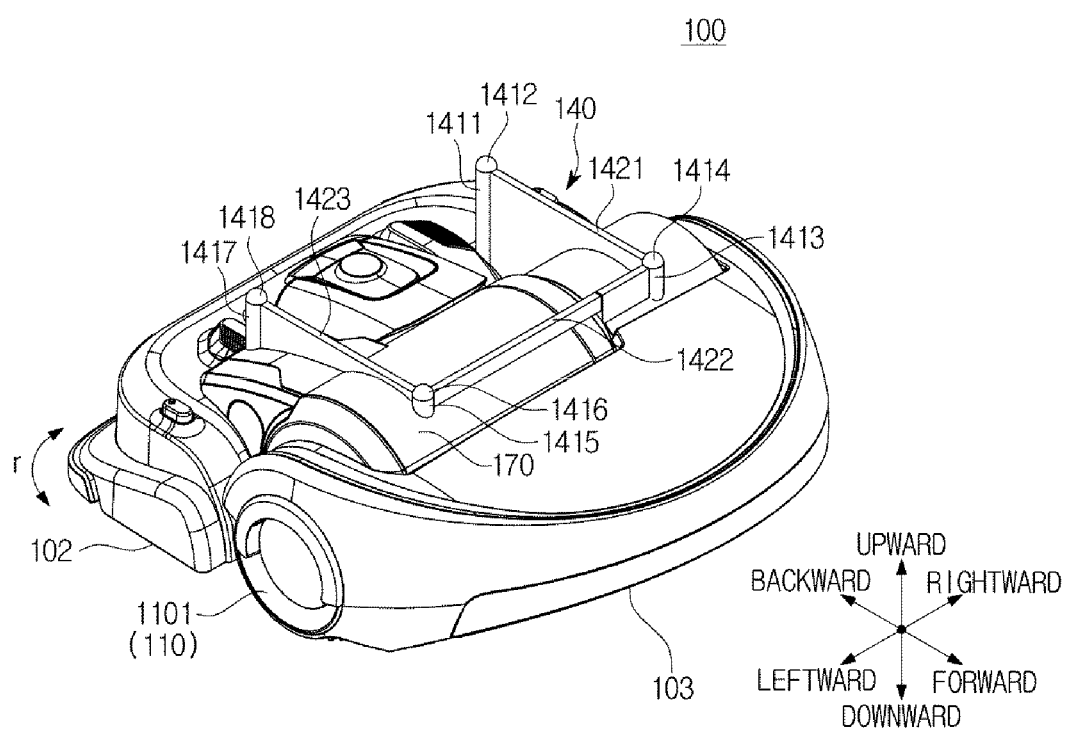
FIG. 2 is a perspective view illustrating one embodiment of a robot cleaner.
Figure 3:
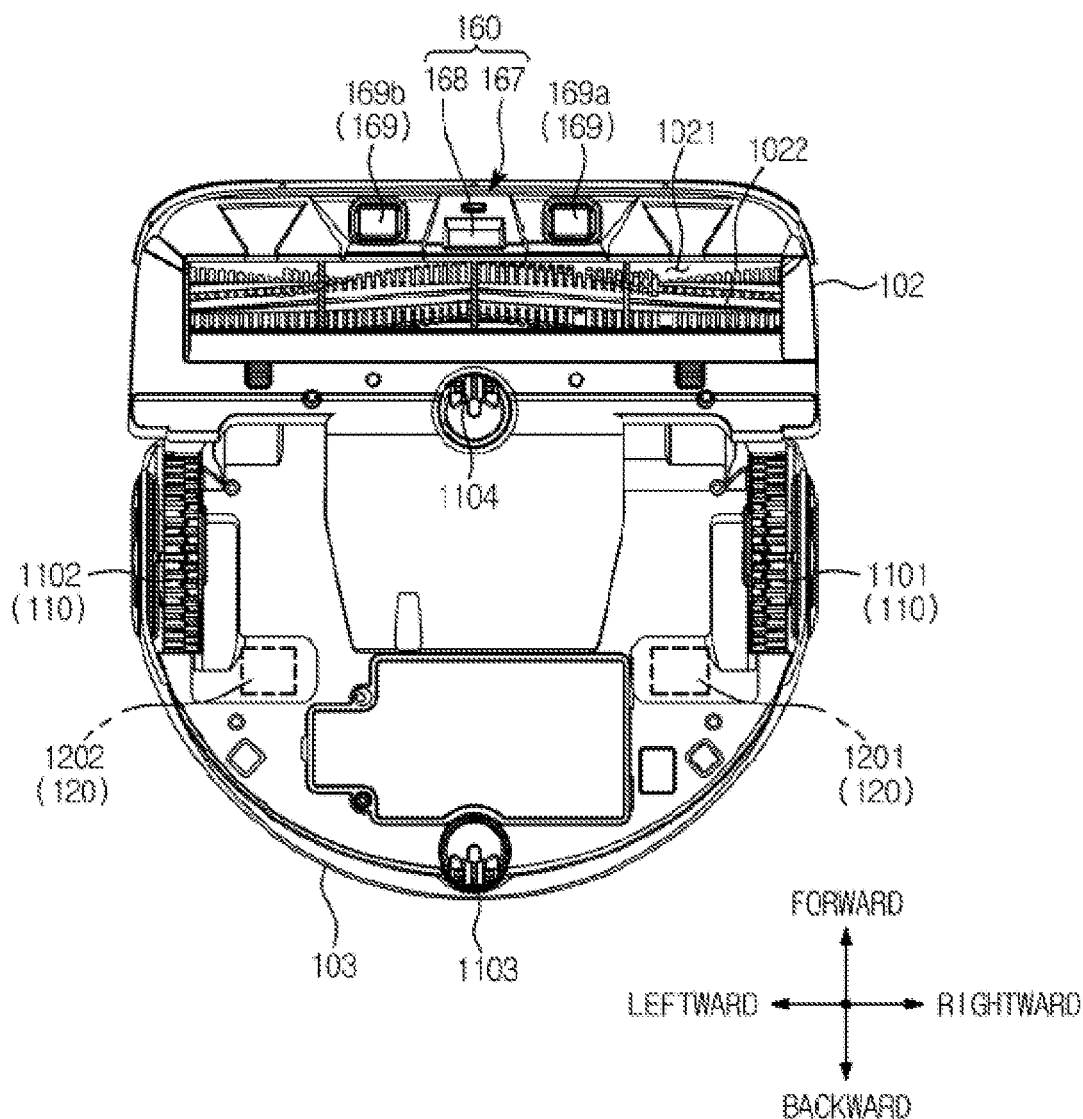
FIG. 3 is a bottom view illustrating one embodiment of the robot cleaner.

FIG. 2 is a perspective view illustrating one embodiment of a robot cleaner, and FIG. 3 is a bottom view illustrating one embodiment of the robot cleaner.

A robot cleaner 100, as shown in FIGS. 2 and 3, may include a front end portion 102 at which various components for suctioning foreign substances on the floor surface are provided and a rear end portion 103 at which various components for movement of the robot cleaner 100, a dust-collecting box 170 for accommodating the suctioned foreign substances, and components such as a processor necessary for operations of the robot cleaner 100 are provided.

As shown in FIG. 2, a first container mounter 140 for mounting the container 99 thereon may be provided at a top end of the robot cleaner 100. The first container mounter 140 may be installed only at the front end portion 102, may be installed only at the rear end portion 103, or may be installed astride both the front end portion 102 and the rear end portion 103.

The first container mounter 140, according to one embodiment, may include one or more posts 1411, 1413, 1415, and 1417, mounters 1412, 1414, 1416, and 1418 formed at top ends of the one or more posts 1411, 1413, 1415, and 1417, and post walls 1421, 1422, 1423, and 1424 formed between the one or more posts 1411, 1413, 1415, and 1417.

The one or more posts 1411, 1413, 1415, and 1417 may be provided to protrude upward from a top end surface of the robot cleaner 100, and the mounters 1412, 1414, 1416, and 1418 may be formed to protrude upward from the top ends of the one or more posts 1411, 1413, 1415, and 1417. The post walls 1421, 1422, 1423, and 1424 may be provided to come into contact with the one or more posts 1411, 1413, 1415, and 1417 and may be integrated with the one or more posts 1411, 1413, 1415, and 1417 depending on a selection of a designer. The post walls 1421, 1422, 1423, and 1424 may be provided to prevent the one or more posts 1411, 1413, 1415, and 1417 from being deformed or to allow the container 99 to be stably mounted on a top end of the robot cleaner 100.

According to one embodiment, the container 99 may be mounted on the top ends of the mounters 1412, 1414, 1416, and 1418 to be mounted on the robot cleaner 100. Mounting grooves corresponding to positions, number, and sizes of the mounters 1412, 1414, 1416, and 1418 may be formed at a bottom surface of the container 99. When the container 99 is mounted on the top ends of the mounters 1412, 1414, 1416, and 1418, the mounters 1412, 1414, 1416, and 1418 are inserted into the mounting grooves in such a way that the container 99 may be stably mounted on the top end of the robot cleaner 100. Accordingly, the container 99 mounted on the robot cleaner 100 may be stably mounted on the top end of the robot cleaner 100 despite the movement of the robot cleaner 100.

According to another embodiment, the container 99 may be mounted in a space formed between the one or more posts 1411, 1413, 1415, and 1417 and the post walls 1421, 1422, 1423, and 1424 and the post walls 1421, 1422, 1423, and 1424 may prevent the container 99 from wobbling or moving to allow the container 99 to be stably mounted on the top end of the robot cleaner 100.

The robot cleaner 100 may include at least one driving wheel 110 and a driver 120 that provides a driving force to the driving wheel 110. In one embodiment, driving wheels 1101 and 1102 may be installed on both sides of the robot cleaner 100, may rotate in mutually identical directions or different directions and/or rotate at the same speed or different speeds to allow the robot cleaner 100 to move forward and backward and/or to rotate. Drivers 1201 and 1202 corresponding to the driving wheels 1101 and 1102 may be provided at the robot cleaner 100. In this case, the driving wheels 1101 and 1102 may independently operate from each other by receiving driving forces from the drivers 1201 and 1201. The robot cleaner 100 may further include auxiliary wheels 1103 and 1104 for assisting forward movement, backward movement and/or rotational movement of the robot cleaner 100, and the auxiliary wheels 1103 and 1104 may be installed on a bottom surface of the robot cleaner 100.

A suction inlet 1021 through which foreign substances on the floor surface are suctioned and a drum brush 1022 rotatably installed at the suction inlet 1021 to scatter foreign substances on the floor may be installed at a bottom surface of the front end portion 102 of the robot cleaner 100. The foreign substances scattered by the drum brush 1022 move toward the dust-collecting box 170.

Also, a position guide device mounter 160 may be formed on the bottom surface of the front end portion 102 of the robot cleaner 100. The position guide device mounter 160 may be provided to be mountable on a robot cleaner mounter 310 (refer to FIG. 5) of a position guide device 300. According to one embodiment, the position guide device mounter 160 may include a mounter 167 mounted on a mounting surface 317 (refer to FIG. 5) of the position guide device 300 and an insertion coupler 168 formed as a protrusion insertable in to an insertion groove 318 (refer to FIG. 5) of the position guide device 300. The robot cleaner 100 may be more stably coupled with the position guide device 300 by coupling the insertion coupler 168 with the insertion groove 318. Depending on embodiments, the position guide device mounter 160 may include an insertion groove (not shown) into which a protrusion (not shown) of the position guide device 300 is insertable, instead of the insertion coupler 168 or in addition to the insertion coupler 168.

A contact terminal 169 may be further formed on the bottom surface of the front end portion 102 of the robot cleaner 100. The contact terminal 169 is provided at a position corresponding to a contact terminal 339 (refer to FIG. 5) provided at the position guide device 300. When the robot cleaner 100 is mounted on the position guide device 300, the contact terminals 169 and 339 come into contact with each other to be conductive. A plurality of contact terminals 169a and 169b may be formed at the robot cleaner 100. When the robot cleaner 100 is mounted on the position guide device 300, the contact terminals 169a and 169b may come into contact with a plurality of corresponding contact terminals 339a and 339b of the position guide device 300, respectively, and accordingly, power may be supplied from the position guide device 300 to the robot cleaner 100.

The position guide device mounter 160 and the contact terminal 169 may be formed at the rear end portion 103 of the robot cleaner 100 depending on embodiments.

Figure 4:
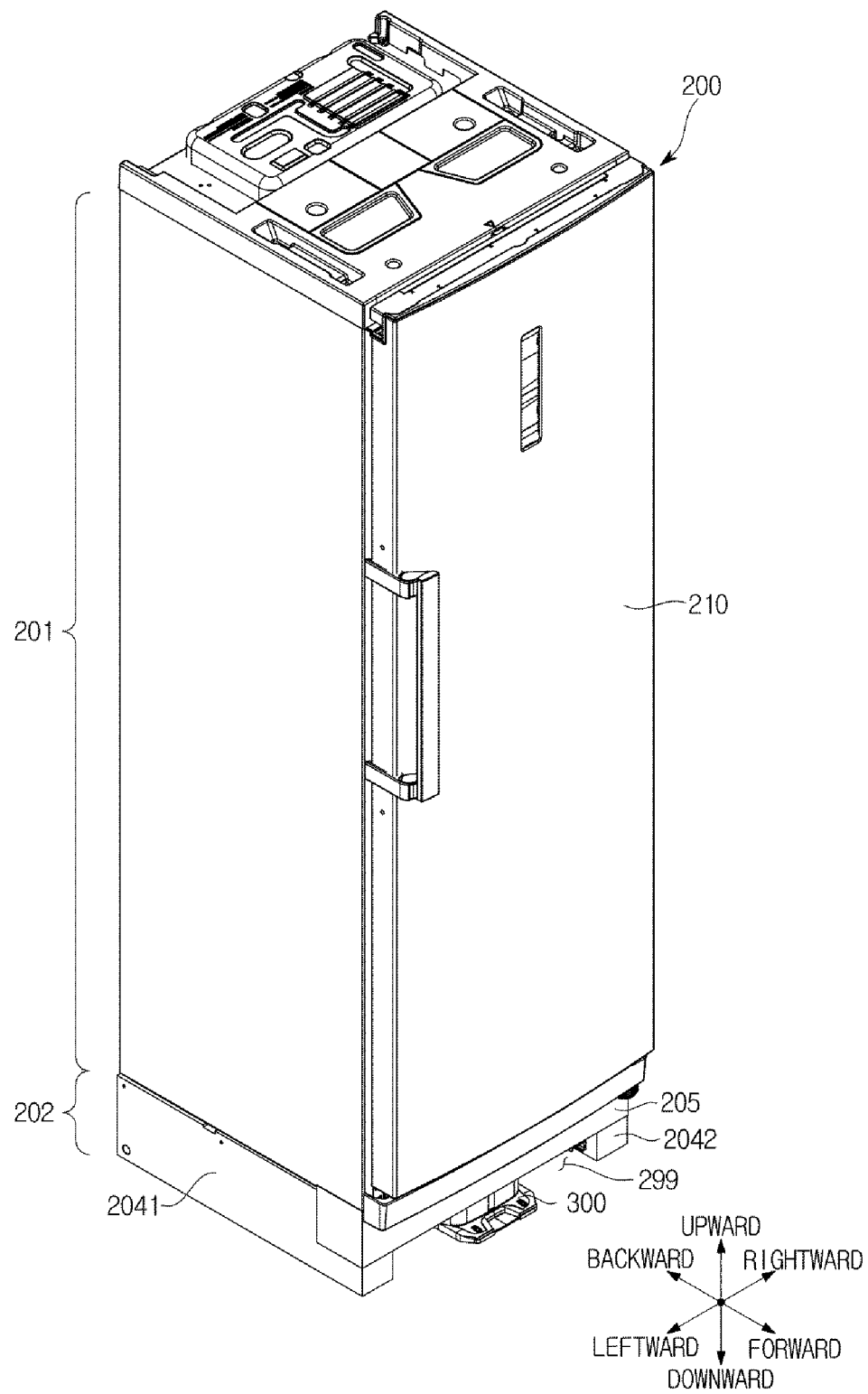
FIG. 4 is a perspective view illustrating a refrigerator and a position guide device according to one embodiment.
Figure 5A:
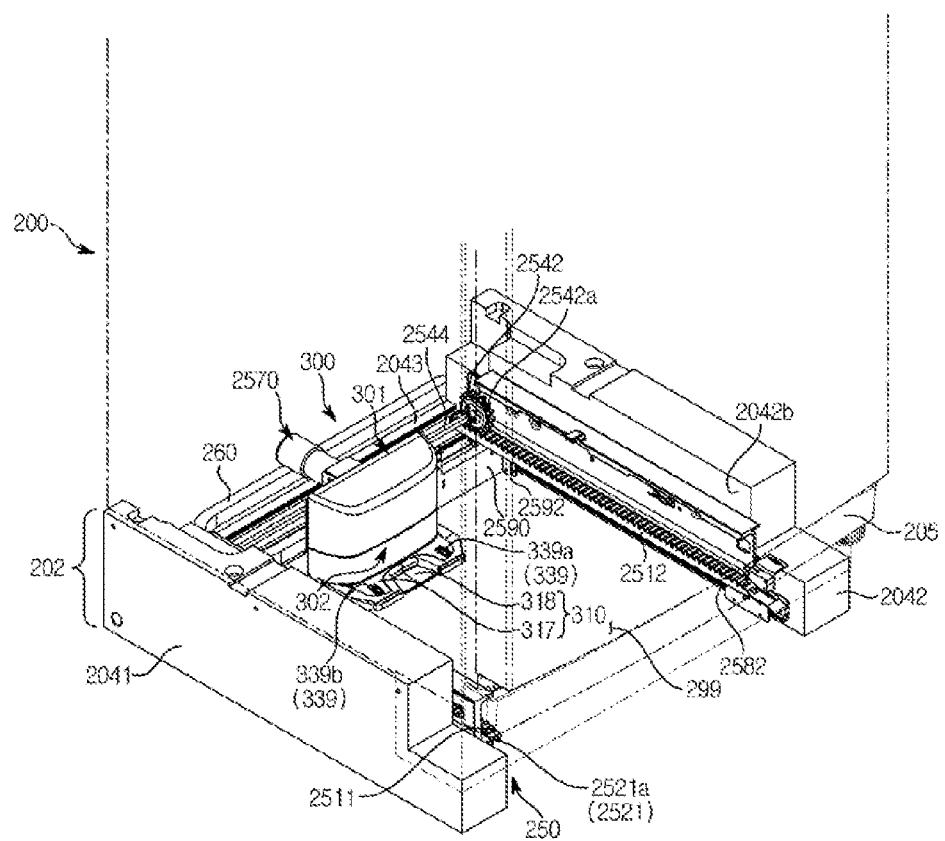
FIG. 5A is a first perspective view of the position guide device according to one embodiment.
Figure 5B:
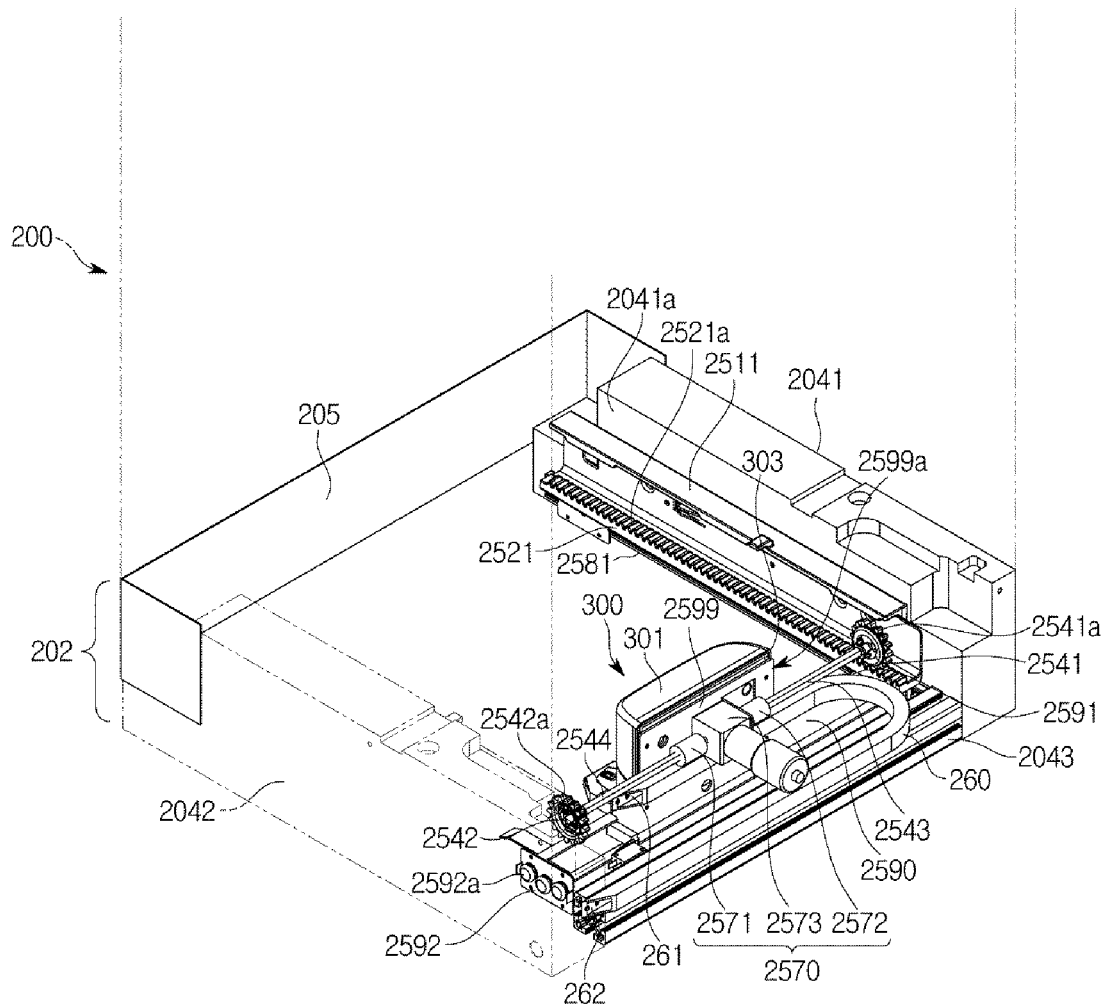
FIG. 5B is a second perspective view of the position guide device according to one embodiment.
Figure 6:
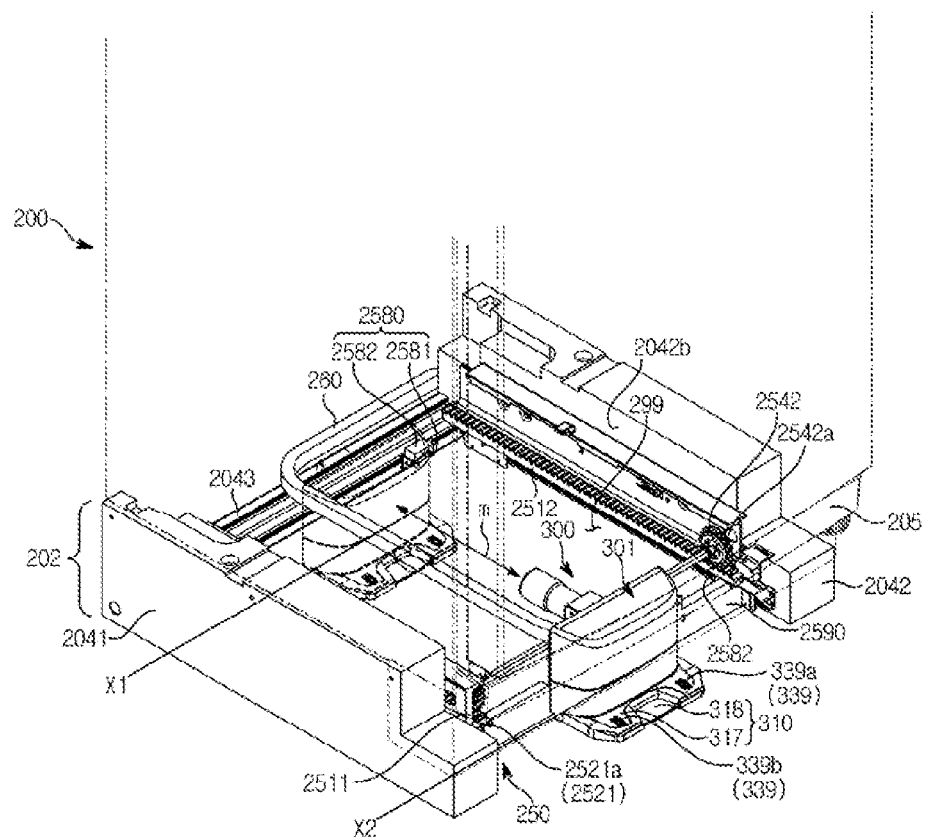
FIG. 6 is a view illustrating a movement of the position guide device.

FIG. 4 is a perspective view illustrating a refrigerator and a position guide device according to one embodiment. FIG. 5A is a first perspective view of the position guide device according to one embodiment, and FIG. 5B is a second perspective view of the position guide device according to one embodiment. FIG. 6 is a view illustrating a movement of the position guide device.

According to one embodiment, a refrigerator 200 may include a door 210 capable of being opened and closed, a top end portion 201 at which a storage compartment 290 (refer to FIG. 9) is provided, and a bottom end portion 202 at which the position guide device 300 and/or a position guide device transferer 250 for transferring the position guide device 300 is installed.

The position guide device 300, as shown in FIG. 4, is formed below the door 210 of the refrigerator 200 and is provided to allow the robot cleaner 100 to be mounted thereon. According to one embodiment, the position guide device 300, as shown in FIGS. 5A to 6, may be provided to be movable in the bottom end portion 202 of the refrigerator 200 and may be stored inside the bottom end portion 202 of the refrigerator 200 or may be exposed outward.

Referring to FIGS. 4, 5A, and 5B, the bottom end portion 202 may include one or more bottom end frames 2041 and 2042 that support the top end portion 201 of the refrigerator 200 and a shielding frame 205. A movement space 299 for movement of the position guide device 300 is provided between the one or more bottom end frames 2041 and 2042 and the shielding frame 205. The position guide device transferer 250 for moving the position guide device 300 in position may be installed in the movement space 299.

Referring to FIGS. 5A and 5B, the position guide device transferer 250 may include guide frames 2511 and 2512 installed in contact with inner surfaces 2041a and 2042b of the bottom end frames 2041 and 2042, racks 2521 and 2522 installed in the guide frames 2511 and 2512, rotors 2541 and 2542 moving along the racks 2521 and 2522, shaft members 2543 and 2544 that rotate according to a driving force generated by a position guide device driver 2570 and transfer the driving force to the rotors 2541 and 2542, and the position guide device driver 2570 that generates the driving force. Depending on embodiments, the position guide device transferer 250 may further include a transfer plate 2590 coupled with the position guide device 300 and guide rails 2581 and 2582 for guiding transfer of the transfer plate 2590.

The guide frames 2511 and 2512 are formed to extend from fronts to rears of the bottom end frames 2041 and 2042. Top ends and bottom ends thereof may be bent toward the movement space 299. The bent top ends are provided to prevent the rotors 2541 and 2542 from deviating upward, and the bent bottom ends are provided to install the racks 2521 and 2522.

The racks 2521 and 2522 extend from the fronts to the rears of the bottom end frames 2041 and 2042 and are installed at the guide frames 2511 and 2512 toward the movement space 299. Sawteeth 2521a and 2522a provided to be engaged with sawteeth 2541a and 2542a on outer surfaces of the rotors 2541 and 2542 may be formed on at least one surface of the racks 2521 and 2522.

The rotors 2541 and 2542 rotate in at least one direction and move along the racks 2521 and 2522 and move the position guide device 300 in the movement space 299 as shown in FIG. 6. According to a rotational direction of the rotors 2541 and 2542, the position guide device 300 may move forward or backward. The sawteeth 2541a and 2542a may be formed on the outer surfaces of the rotors 2541 and 2542. One ends of the shaft members 2543 and 2544 are coupled with rotational centers of the rotors 2541 and 2542.

The transfer plate 2590 may be installed on a rear surface 303 and the like of the position guide device 300. Both ends 2591 and 2592 of the transfer plate 2590 are movably coupled with the guide rails 2581 and 2582 in such a way that the position guide device 300 may be stably movable forward and/or backward without deviation. The transfer plate 2590 may have a shape in which a center 2599 thereof relatively protrudes upward to adequately fix the position guide device 300. Top end boundaries of the both ends 2591 and 2592 of the transfer plate 2590 may be disposed below the racks 2521 and 2522 and may be spaced apart at certain intervals from bottom surfaces of the racks 2521 and 2522. As necessary, a wheel 2592a that moves along the guide rails 2581 and 2582 may be further provided at the both ends 2591 and 2592 of the transfer plate 2590.

The position guide device driver 2570 may provide rotational forces to the shaft members 2543 and 2544 to allow the rotors 2541 and 2542 to be rotatable in a certain direction. When the position guide device driver 2570 operates, the rotors 2541 and 2542 rotate and accordingly the position guide device 300 is movable forward or backward. On the other hand, when the position guide device driver 2570 stops operation, the rotors 2541 and 2542 also stop operation and accordingly the position guide device 300 stops at a certain position.

Referring to FIG. 5B, in one embodiment, the position guide device driver 2570 may include drivers 2571 and 2572 connected to other ends of the shaft members 2543 and 2544 to provide rotational driving forces with respect to the shaft members 2543 and 2544 and various electronic components (not shown) for supporting operations of the drivers 2571 and 2572. The drivers 2571 and 2572 may be provided corresponding to the rotors 2541 and 2542 respectively. In this case, the number of the drivers 2571 and 2572 may be identical to the number of the rotors 2541 and 2542. Depending on driving of the drivers 2571 and 2572, the rotors 2541 and 2542 are rotatable clockwise or counterclockwise. The drivers 2571 and 2572 may be embodied using at least one motor. In this case, the motor may include a brushless direct-current (BLDC) motor. To prevent damages, the various electronic components for supporting operation of the drivers 2571 and 2572 may be provided to be built in a driver housing 2573. As necessary, the position guide device driver 2570 may further include a communication means for electrically connecting the various electronic components to an external power source and/or a processor, for example, a cable (not shown).

Also, according to another embodiment, the position guide device driver 2570 may be embodied using at least one motor (not shown) and a plurality of gears (not shown). For example, the position guide device driver 2570 may be embodied using a motor capable of generating a rotational force in different directions depending on an electric signal and at least one bevel gear for changing a rotational direction supplied by the motor and may further include a spur gear and the like as necessary.

The position guide device driver 2570, as shown in FIG. 5B, may be installed on the rear surface 303 of the position guide device 300. When the transfer plate 2590 is installed on the rear surface 303 of the position guide device 300, the position guide device driver 2570 may be fixedly installed on a rear surface 2599a of the center 2599. However, the position guide device driver 2570 is not limited in an installation position and an installation method and may be installed in various positions according to various methods considered by a designer.

According to one embodiment, a cable storage 260 in which cables that supply power to the position guide device 300 are built may be further formed on the rear surface 303 of the position guide device 300 or the rear surface 2599a of the transfer plate 2590. The cable storage 260 may have a tubular shape in which a space for accommodating a cable is formed, and openings 261 and 262 are formed at both ends to allow the cable to pass therethrough. A cable exposed at the opening 261 at one end is provided to be electrically connected to the position guide device 300 and a cable exposed at the opening 262 at the other end is provided to be electrically connected to a separate power source and/or a processor and the like in such a way that power may be supplied to the position guide device 300. When the robot cleaner 100 is mounted on the position guide device 300, the power supplied to the position guide device 300 may be transferred to the robot cleaner 100 via the contact terminal 339 of the position guide device 300 and the contact terminal 169 of the robot cleaner 100 in such a way that the robot cleaner 100 may be charged. The cable storage 260, as shown in FIG. 6, may be provided to be deformed in shape depending on a movement m of the position guide device 300.

As shown in FIGS. 4 to 6, when a plurality of such bottom end frames 2041 and 2042 are provided at the refrigerator 200, a supporting frame 2043 may be installed between the plurality of bottom end frames 2041 and 2042 to fix the plurality of bottom end frames 2041 and 2042. In this case, one end of the supporting frame 2043 may be fixed to one bottom end frame 2041 and the other end thereof may be fixed to the other bottom end frame 2402 to prevent the plurality of bottom end frames 2041 and 2042 from deviating.

According to one embodiment, as shown in FIG. 6, an arrival sensor 2580 may be further formed at the supporting frame 2043. The arrival sensor 2580 may sense whether the position guide device 300 arrives at the supporting frame 2043. The arrival sensor 2580, in one embodiment, may include a switch 2581 compressed by the transfer plate 2590 at which position guide device 300 is installed and a signal generator 2582 that generates an electrical signal depending on whether the switch 2581 is compressed. When the position guide device 300 moves forward and the switch 2581 is not compressed, a circuit provided in the signal generator 2582 is conducted in such a way that the signal generator 2582 may output an electrical signal. On the other hand, when the position guide device 300 moves backward and arrives at the supporting frame 2043, the transfer plate 2590 at which the position guide device 300 is installed compresses the switch 2581 and the circuit is cut off according to the compression of the switch 2581 in such a way that the signal generator 2582 may not output an electrical signal. A signal generated by the signal generator 2582 may be transmitted to the position guide device driver 2570, and the position guide device driver 2570 may operate depending on whether the signal is received and may generate or not generate a driving force. For example, when the position guide device 300 arrives at the supporting frame 2043, the position guide device driver 2570 may not generate a driving force according to suspension of signal transmission and accordingly the position guide device 300 stops. On the other hand, when the position guide device 300 does not yet arrive at the supporting frame 2043, the position guide device driver 2570 may continuously generate a driving force corresponding to signal reception to allow the position guide device 300 to continuously move backward.

The position guide device 300 may be provided to interwork movements of the rotors 2541 and 2542 along the racks 2521 and 2522 and to move forward and/or backward as m shown in FIG. 6 in the movement space 299. In this case, the position guide device 300 may be provided to be movable only within a certain range, for example, a range between a first point X1 and a second point X2. For example, a forward movement of the position guide device 300 may be limited by the shielding frame 205 and a backward movement of the position guide device 300 may be limited by the supporting frame 2043. The position guide device 300 may stop at a random position within a certain range.

The position guide device 300 may include an external housing 301 in which various necessary components are built. The robot cleaner mounter 310 is provided on a front surface 302 of the external housing 301 to mount the robot cleaner 100 thereon. For example, the mounting surface 317 on which the mounter 167 of the robot cleaner 100 is mounted and the insertion groove 318 in which the insertion coupler 168 of the robot cleaner 100 is inserted may be provided on the front surface 302 of the position guide device 300. Also, depending on embodiments, the contact terminal 339 that comes into contact with the contact terminal 169 provided on the bottom surface of the front end portion 102 of the robot cleaner 100 when the robot cleaner 100 is mounted may be further provided on the front surface 302 of the external housing 301. The plurality of such contact terminals 339a and 339b may be formed on the front surface 302 of the external housing 301 and come into contact with the plurality of contact terminals 169a and 169b of the robot cleaner 100 respectively to conduct the robot cleaner 100 and the position guide device 300 when the robot cleaner 100 is mounted on the position guide device 300. The rear surface 303 of the position guide device 300 may be fixedly mounted on the transfer plate 2590, and accordingly, the position guide device 300 may stably move within the movement space 299.

Various components for movement of the position guide device 300 may be provided in the external housing 301 of the position guide device 300, and for example, a component for providing power to the guide device driver 2570 may be provided. For example, power supplied through the cable installed in the cable storage 260 may be transferred to the position guide device driver 2570 via the circuit in the external housing 301. Also, various circuits and related components necessary for charging the robot cleaner 100 may be further provided in the external housing 301.

In addition to the above description of the position guide device 300, depending on consideration of a designer, a position sensor for sensing a position of the position guide device 300 or an additional sensor for sensing whether the robot cleaner 100 is mounted may be further provided.

Figure 7:
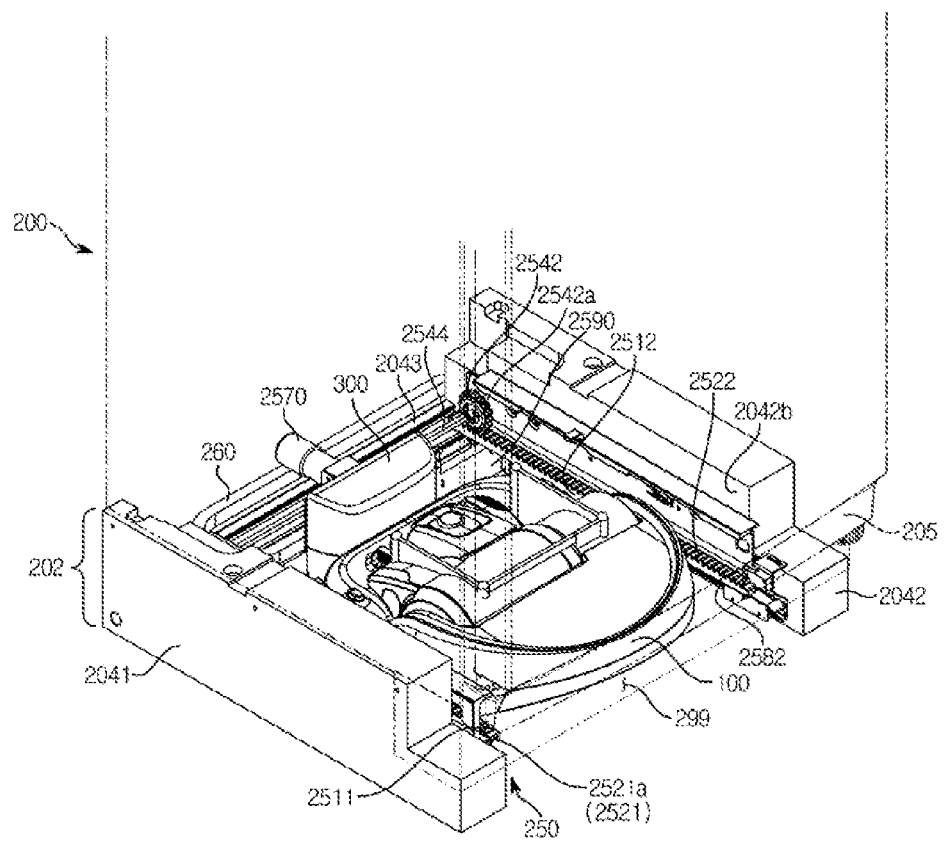
FIG. 7 is a view illustrating an example in which the robot cleaner is mounted on the position guide device.
Figure 8:
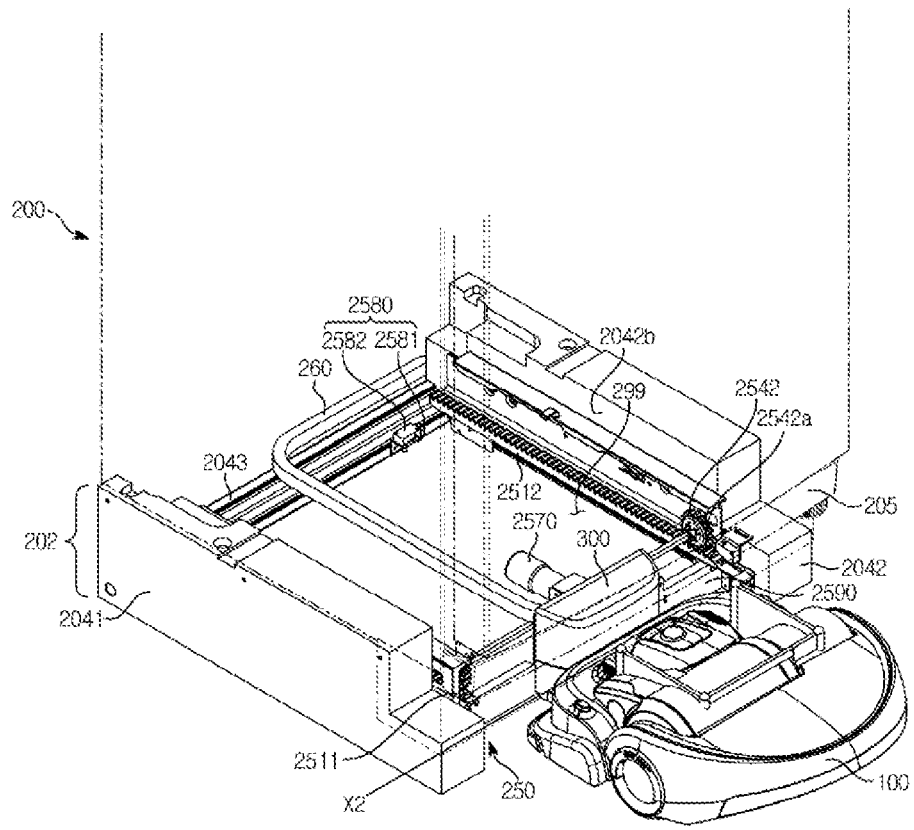
FIG. 8 is a view illustrating another example in which the robot is mounted on the position guide device.

FIG. 7 is a view illustrating an example in which the robot cleaner is mounted on the position guide device, and FIG. 8 is a view illustrating another example in which the robot is mounted on the position guide device.

As described above, the position guide device 300 is provided to move forward and backward m in the movement space 299 and to be stoppable at at least one position. In this case, the robot cleaner 100, as shown in FIGS. 7 and 8, is provided to be mounted on the position guide device 300 at each of the points X1 and X2.

For example, as shown in FIG. 7, when the position guide device 300 is disposed at the first point X1 located in the bottom end portion 202 of the refrigerator 200, the robot cleaner 100 may enter the movement space 299 between the bottom end frames 2041 and 2042 and may be mounted on the position guide device 300 disposed at the first point X1. Accordingly, the robot cleaner 100 may be stored in the bottom end portion 202 of the refrigerator 200. In this case, depending on a selection of designer, the robot cleaner 100 may be stored in the bottom end portion 202 of the refrigerator 200 not to expose the whole part or may be stored in the bottom end portion 202 of the refrigerator 200 to expose one part, for example, one part of the rear end portion 103. When the position guide device 300 can perform a charging function, the robot cleaner 100 may be charged while being stored in the bottom end portion 202 of the refrigerator 200.

Also, as shown in FIG. 8, when the position guide device 300 is disposed at the second point X2 located in front of the bottom end portion 202 of the refrigerator 200, the position guide device 300 may be entirely or partially exposed and the robot cleaner 100 may be mounted on the position guide device 300 without entering the movement space 299. In this case, since the position guide device 300 is exposed at a bottom end of the door 210 of the refrigerator 200, the robot cleaner 100 is positioned in front of the refrigerator 200 while being adjacent to the door 210 and the first container mounter 140 of the robot cleaner 100 is also positioned in front of the door 210 adjacent thereto. When the robot cleaner 100 is disposed as described above, the container 99 in the refrigerator 200 may move according to movement of a container provider 230 and may be mounted on the first container mounter 140 of the robot cleaner 100.

Although it has been described above that the position guide device 300 is movable in the bottom end portion 202 of the refrigerator 200, the position guide device 300 may be designed to be immovable depending on embodiments. In this case, the position guide device 300 may be designed to be always exposed outside the refrigerator 200. For example, the position guide device 300, as shown in FIG. 4, may be fixedly installed to be entirely or partially exposed in front of the bottom end portion 202 of the refrigerator 200. In this case, the robot cleaner 100 may not be stored in the bottom end portion 202 of the refrigerator 200 and may be disposed only at one position in front of the door 210 of the refrigerator 200 as shown in FIG. 8.

Figure 9:
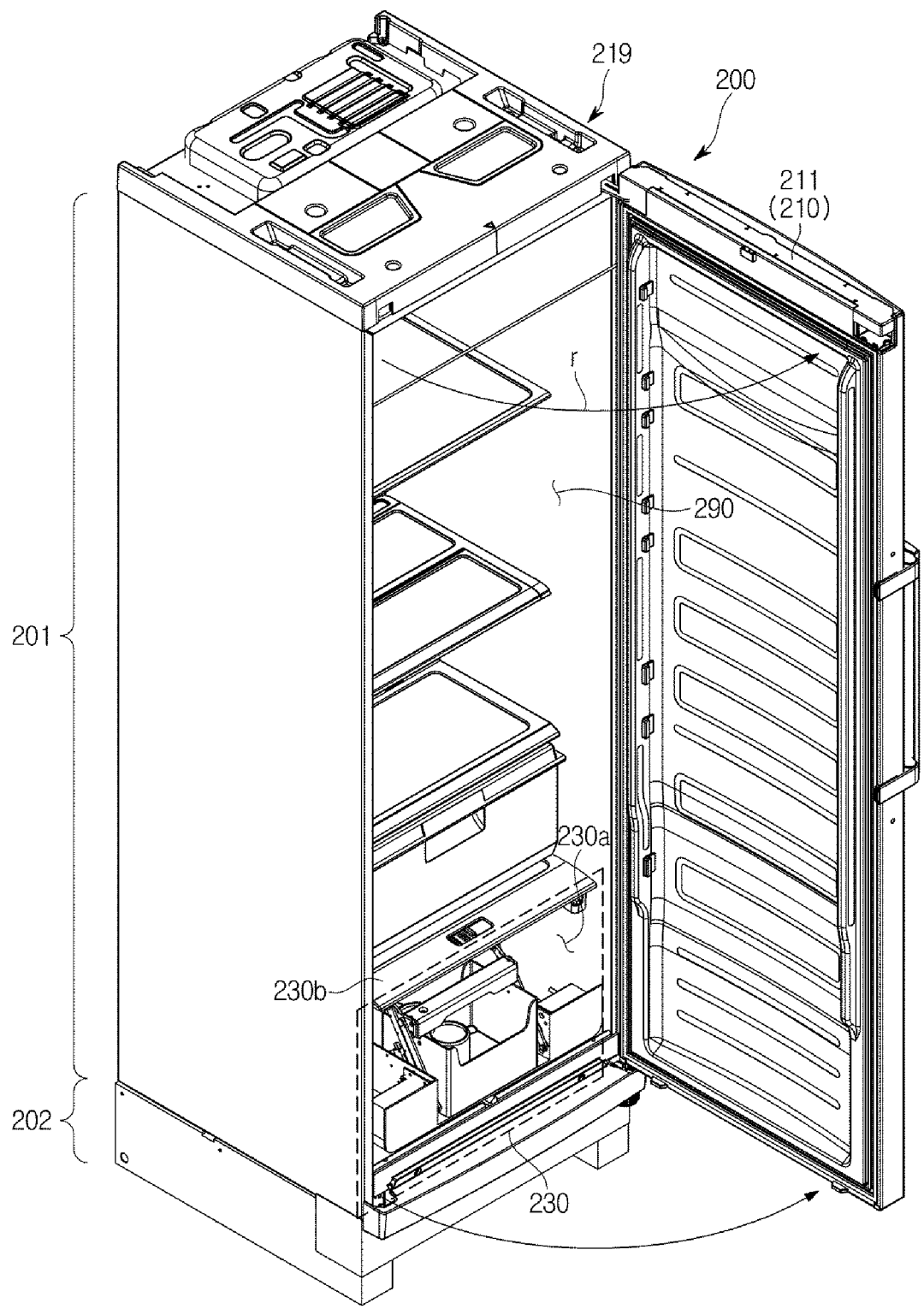
FIG. 9 is a view illustrating an internal structure of the refrigerator.

FIG. 9 is a view illustrating an internal structure of the refrigerator.

As shown in FIG. 9, the refrigerator 200 may include an external housing 219 that has one open surface and the other surface closed by a partition to form the storage compartment 290 therein and the door 210 formed at the one surface of the external housing 219 to open and close the storage compartment 290.

Various components necessary for operation of the refrigerator 200, for example, a condenser 292 (refer to FIG. 16), an expansion valve 293 (refer to FIG. 16), a compressor 294 (FIG. 16), a heat exchanger 295 (refer to FIG. 16) and the like are installed inside or outside the external housing 219.

The storage compartment 290 is provided in the external housing 219 to store items to be stored. The storage compartment 290 may be provided to remain at a certain temperature or less according to operations of the condenser 292, the expansion valve 293, the compressor 294, the heat exchanger 295 and the like. The storage compartment 290 may be divided into a plurality of sections by one or more partition walls (not shown) or panels and may include a separate door for each of the sections as necessary. The plurality of sections may be used as at least one of a refrigeration compartment and a fridge compartment.

According to one embodiment, a container storage space 230a in which the container provider 230 is installed may be provided in the storage compartment 290. The container storage space 230a may be formed at a bottom end portion of the storage compartment 290 and may be disposed right above the bottom end portion 202 of the refrigerator 200 to adequately mount the container 99 on the robot cleaner 100. Depending on embodiments, the container storage space 230a may be provided to be separated from another space of the storage compartment 290 by a certain partition wall or a panel 230b but does not need to be surely separated from another space of the storage compartment 290.

The door 210 may be provided to open and close the storage compartment 290 using various methods applicable to the refrigerator 200 such as a sliding door type and/or a hinged door type. The door 210 may open or close the storage compartment 290 according to a manual operation of a user or may automatically open and close the storage compartment 290 according to predefined settings.

For example, the door 210 may include a leaf 211, a leaf mover 212 for rotationally moving the leaf 211, and a driver 213 for driving the leaf mover 212. The leaf 211 may be provided to close or open one open surface of the external housing 219 and may have a shape corresponding to that of the external housing 219. The leaf mover 212 may be provided to allow the leaf 211 to open or close the open one surface of the external housing 219 by rotating the leaf 211 in a certain direction r or moving the leaf 211 in a certain direction. The leaf mover 212 may be formed including at least one hinge. The driver 213 may drive the leaf mover 212 to allow the leaf 211 to automatically close or open the open one surface of the external housing 219. For example, the driver 213 may rotate the hinge of the leaf mover 212 on a certain axis to allow the leaf 211 to interwork and rotate in such a way that the leaf 211 may automatically close or open the open one surface of the external housing 219. Although one example of the door 210 has been described above, a structure for opening and/or closing the door 210 is not limited thereto and may be provided in various structures considerable by a designer.

Figure 10A:
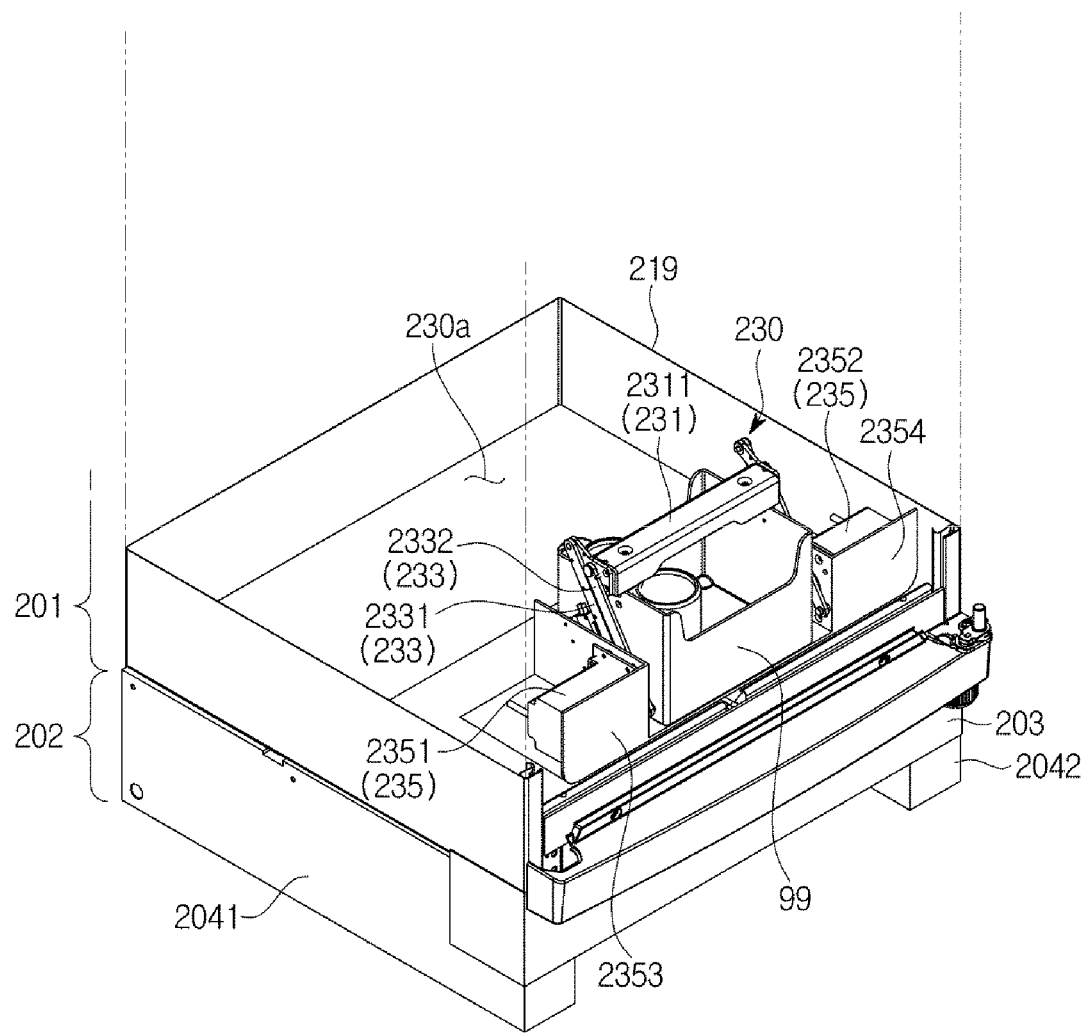
FIG. 10A is a first view illustrating one embodiment of the container provider.
Figure 10B:
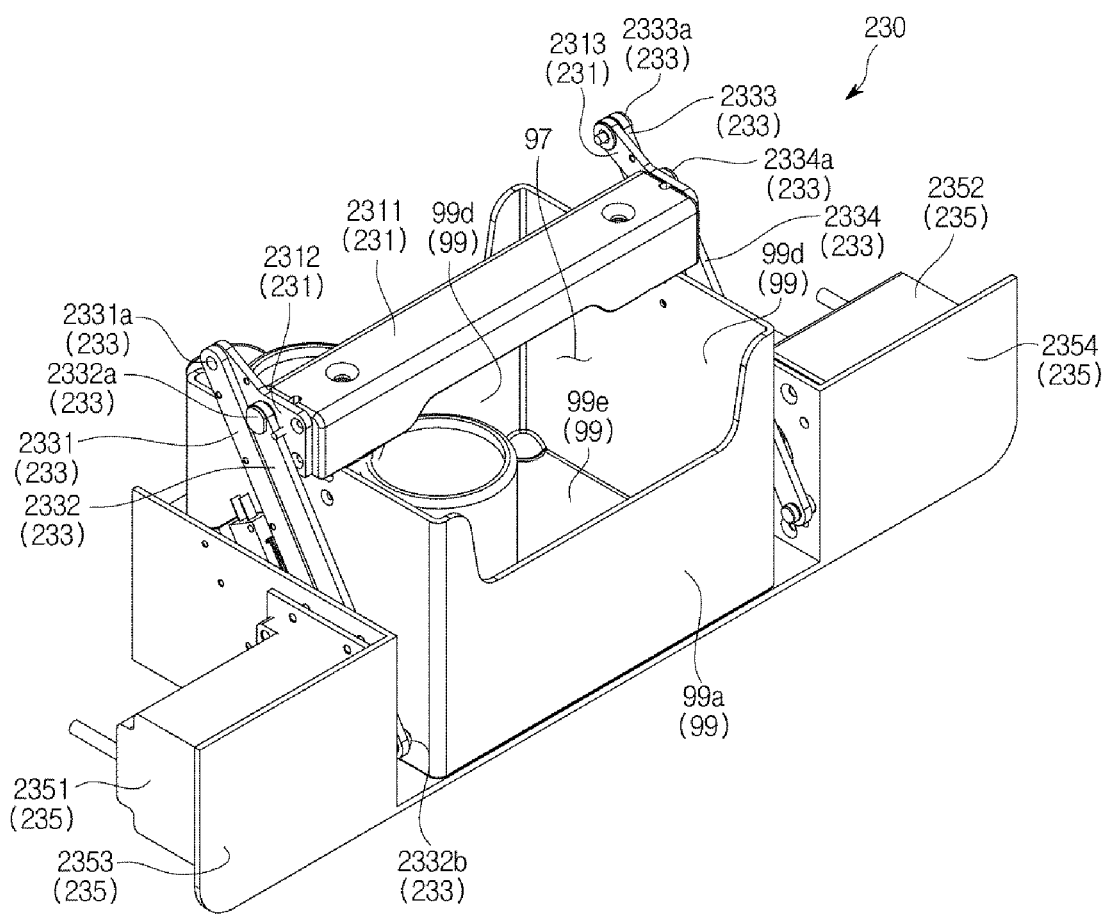
FIG. 10B is a second view illustrating one embodiment of the container provider.
Figure 11:
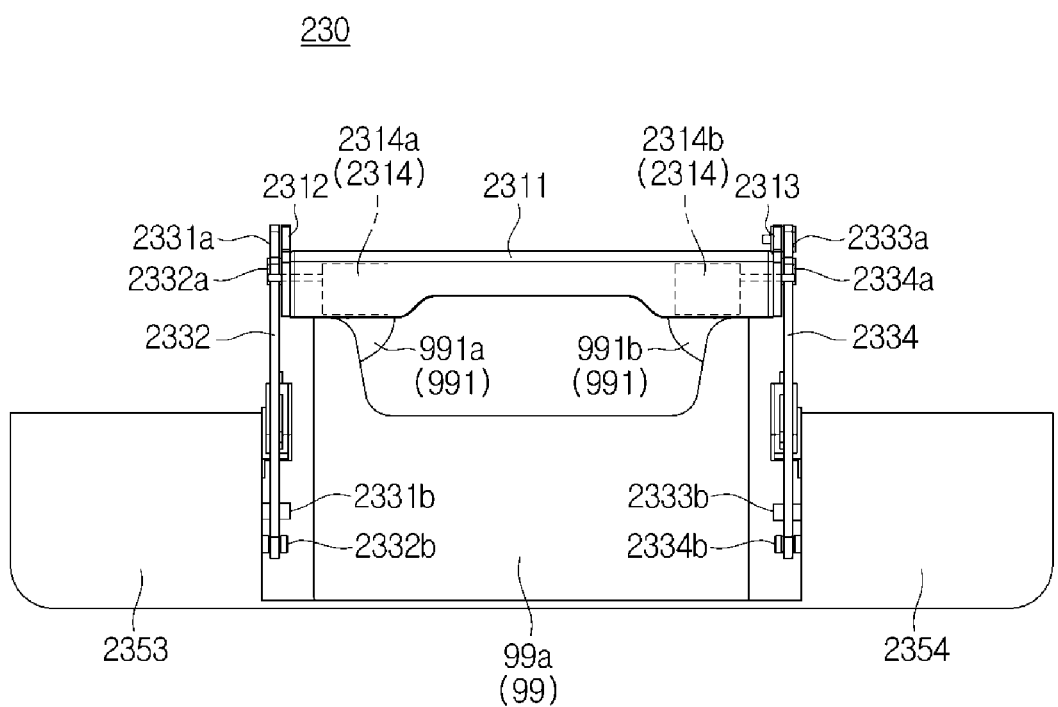
FIG. 11 is a third view illustrating one embodiment of the container provider.

FIG. 10A is a first view illustrating one embodiment of the container provider, and FIG. 10B is a second view illustrating one embodiment of the container provider. FIG. 11 is a third view illustrating one embodiment of the container provider.

As shown in FIGS. 10A to 11, the container provider 230 may include the container 99, a second container mounter 231 on which the container 99 is mounted, a container transferer 233 that transfers the container 99 and the second container mounter 231, and a driver 235 that provides a driving force to the container transferer 233.

The container 99 may be provided to store various items to be stored such as food, cans, polyethylene terephthalate (PET) bottles or the like. The container 99 may include, for example, a plurality of partition walls 99a to 99d with open top surfaces and a bottom surface 99e, and a storage space 97 may be formed by the plurality of partition walls 99a to 99d and the bottom surface 99e.

According to one embodiment, the container 99 may include a mounted portion 991 mounted on the second container mounter 231. For example, the container 99 may include two mounted portions 991a and 991b formed on the two partition walls 99b and 99d facing each other among the plurality of partition walls 99a to 99d. The two mounted portions 991a and 991d may be mounted on mounting members 2314a and 2314b corresponding to the second container mounter 231 to allow the container 99 to be mounted on the second container mounter 231. In this case, mounted surfaces 992a and 992b (refer to FIG. 14) may be provided at top ends of the mounted portions 991a and 991b. When the mounting members 2314a and 2314b are embodied as electromagnets, the mounted surfaces 992a and 992b may be embodied using metal materials, magnets or the like to be attached to the mounting members 2314a and 2314b through a magnetic field to be mounted thereon.

The second container mounter 231 is provided to allow the container 99 to be mountable thereon. The second container mounter 231, for example, as shown in FIGS. 10A and 10B, may be provided at a top end of the container 99, or as another example, may be provided on a side or at a bottom end of the container 99. Also, the second container mounter 231, for example, may be provided to mount the top end of the container 99 or may be provided to mount the side or the bottom end of the container 99.

According to one embodiment, the second container mounter 231 may include a mounting member 2314 on which the mounted portion 991 of the container 99 is mounted. The mounting member 2314 may be provided at a position on which the mounted portion 991 is mountable, corresponding to the mounted portion 991 of the container 99. The second container mounter 231, for example, may include a plurality of such mounting members 2314a and 2314b corresponding to a plurality of such mounted portions 991a and 991b.

According to one embodiment, the mounting members 2314a and 2314b may be embodied using electromagnets. The electromagnets may generate magnetic forces at certain levels according to a current flow. When currents flow, the mounting members 2314a and 2314b may generate magnetic fields and the mounted surface 992a and 992b of the mounted portion 991a and 991b are attached to the mounting members 2314a and 2314b due to the magnetic fields generated by the mounting members 2314a and 2314b. On the other hand, when the currents are cut off, the mounting members 2314a and 2314b may not generate magnetic fields and the mounted portions 991a and 991b may deviate from the mounting members 2314a and 2314b. Accordingly, the container 99 may be mounted on or separated from the second container mounter 231 as necessary.

Depending on embodiments, the mounting members 2314a and 2314b may be embodied using various fastening members in addition to electromagnets. For example, the fastening members may include hooks, tweezers, holders, movable screws or pins or the like. The fastening members may automatically operate according to predefined settings to allow the container 99 to be mounted on the second container mounter 231 or to be separated from the second container mounter 231. Also, panels, bars or the like that protrude to support the container 99 when the second container mounter 231 is positioned on a side or the bottom surface of the container 99 may be an example of the mounting members 2314a and 2314b. Additionally, various mounting means considerable by a designer may be used as the mounting members 2314a and 2314b.

The second container mounter 231 may include a supporting bar 2311. The mounting member 2314 may be installed inside or outside the supporting bar 2311. The container transferer 233 may be provided to be installable at at least one end of the supporting bar 2311. For installing the container transferer 233, one or more brackets 2312 and 2313 may be installed at at least one end of the supporting bar 2311.

The container transferer 233 is provided to transfer the container 99 to the robot cleaner 100 outside the refrigerator

200. The container transferer 233, depending on embodiments, may be embodied using a robot arm, a conveyer device, and/or a lifter.

For example, the container transferer 233, as shown in FIGS. 10A to 11, may be embodied using pivoting members 2331 to 2334. In detail, the container transferer 233 may include one or more pivoting members 2331 to 2334 and the one or more pivoting members 2331 to 2334 rotate according to a driving force provided by the driver 235 and discharge the container 99 to the outside of the refrigerator 200.

The container transferer 233 may include a plurality of pivoting members, that is, first to fourth pivoting members 2331 to 2334.

The first pivoting member 2331 may be embodied as a rode. One end of the rode may be pivotably coupled with the bracket 2312 installed at one end of the supporting bar 2311 using a top end shaft member 2331a such as a bolt or pin, and the other end thereof may be pivotably coupled with a first supporting frame 2353 using a bottom end shaft member 2331b.

The second pivoting member 2332 is installed adjacently to the first pivoting member 2331 in the same direction. The second pivoting member 2332 has a rode shape. One end thereof is pivotably coupled with the bracket 2312 installed at the one end of the supporting bar 2311 using a top end shaft member 2332a, and the other end thereof is pivotably coupled with a first driver 2351 using a bottom end shaft member 2332b to rotate according to a driving force of the first driver 2351. When the second pivoting member 2332 pivots, the first pivoting member 2331 interworks with pivoting of the second pivoting member 2332 and rotate around the bottom end shaft member 2331b.

The third pivoting member 2333 is installed opposite the first pivoting member 2331 and the second pivoting member 2332 based on the supporting bar 2311. The third pivoting member 2333 has a rode shape. One end thereof may be pivotably coupled with the bracket 2313 formed at the other end of the supporting bar 2311 using a top end shaft member 2333a, and the other end thereof may be pivotably coupled with a second supporting frame 2354 using a bottom end shaft member 2333b.

The fourth pivoting member 2334 is installed adjacently to the third pivoting member 2333 in the same direction. The fourth pivoting member 2334 may also have a rode shape. One end thereof is pivotably coupled with the bracket 2313 formed at the other end of the supporting bar 2311 using a top end shaft member 2334a, and the other end thereof is pivotably coupled with a second driver 2352 using a bottom end shaft member 2334b. When the fourth pivoting member 2334 pivots due to the second driver 2352, the third pivoting member 2333 interworks therewith and rotates around the bottom end shaft member 2333b.

The first supporting frame 2353 and the second supporting frame 2354 are installed on both boundaries of the refrigerator 200 opposite to each other based on an area in which the container 99 may be disposed. The first pivoting member 2331 and the third pivoting member 2333 may be pivotably installed on one surfaces of the first supporting frame 2353 and the second supporting frame 2354 toward the container 99.

Figure 13:
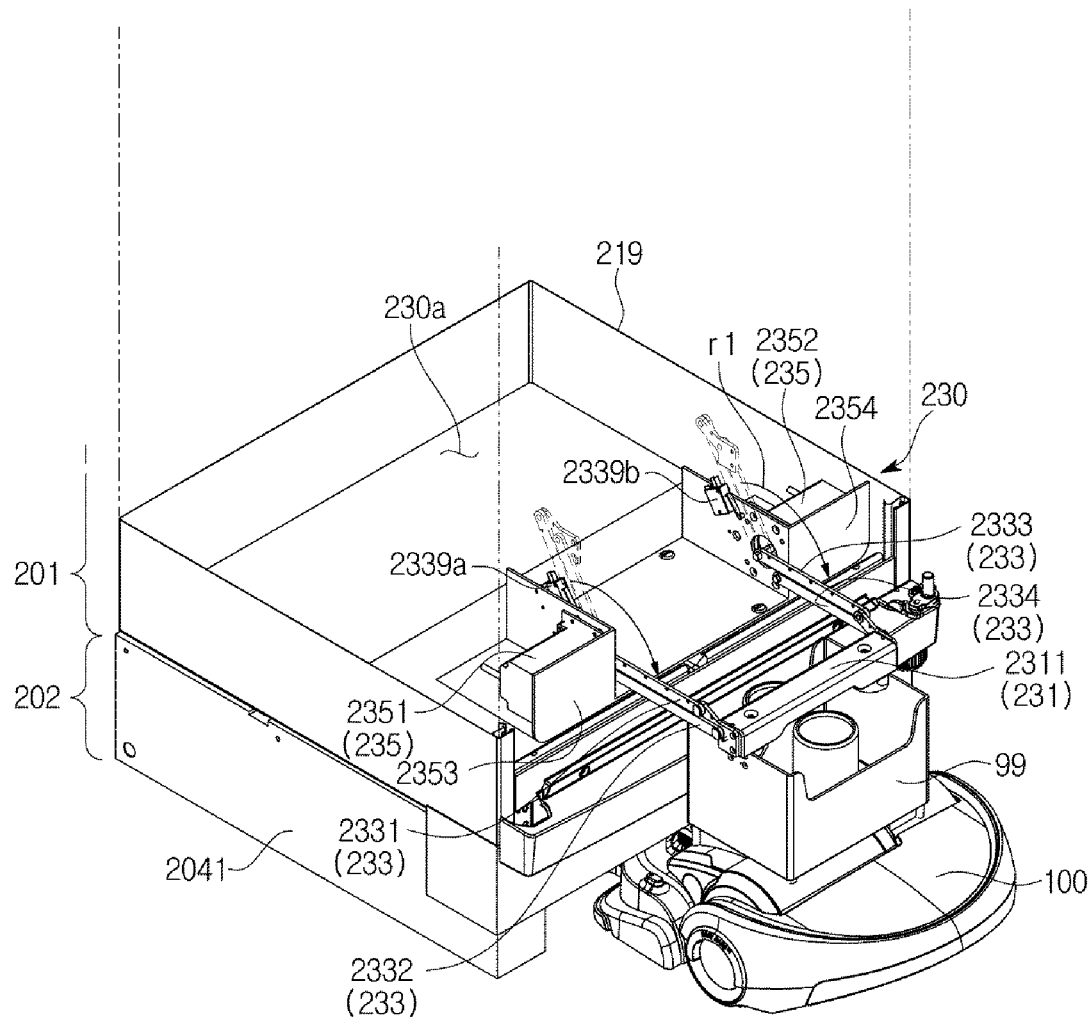
FIG. 13 is a second view illustrating the operation of the container provider mounting the container on the robot cleaner.\

According to one embodiment, pivoting member return sensors 2339a and 2339b (refer to FIG. 13) that output electrical signals when the first pivoting member 2331 and the third pivoting member 2333 are mounted may be provided on the one surfaces of the first supporting frame 2353 and the second supporting frame 2354 toward the container 99. The pivoting member return sensors 2339a and 2339b, as shown in FIG. 13, are provided corresponding to the first pivoting member 2331 and the third pivoting member 2333. When the first pivoting member 2331 and the third pivoting member 2333 come into contact, the pivoting member return sensors 2339a and 2339b output signals or cut off the output of signals to sense whether the first pivoting member 2331 and the third pivoting member 2333 return to original states.

The driver 235 is provided corresponding to the container transferer 233 to allow the container transferer 233 to transfer the container 99. For example, the driver 235, as shown in FIGS. 10A and 10B, may include the first driver 2351 and the second driver 2352.

The first driver 2351 and the second driver 2352 may be installed at the first supporting frame 2353 and the second supporting frame 2354 toward an outer wall of the refrigerator 200. The first driver 2351 and the second driver 2352 generate and transfer driving forces according to supplied power to the corresponding bottom end shaft members 2332b and 2334b, and accordingly, the second pivoting member 2332 and the fourth pivoting member 2334 pivot. The first driver 2351 and the second driver 2352 may generate rotational driving forces in opposite directions to allow the second pivoting member 2332 and the fourth pivoting member 2334 to pivot in the same direction. The first driver 2351 and the second driver 2352 may each generate rotational driving forces clockwise or counterclockwise. The first driver 2351 and the second driver 2352 may be embodied using motors.

Figure 12:
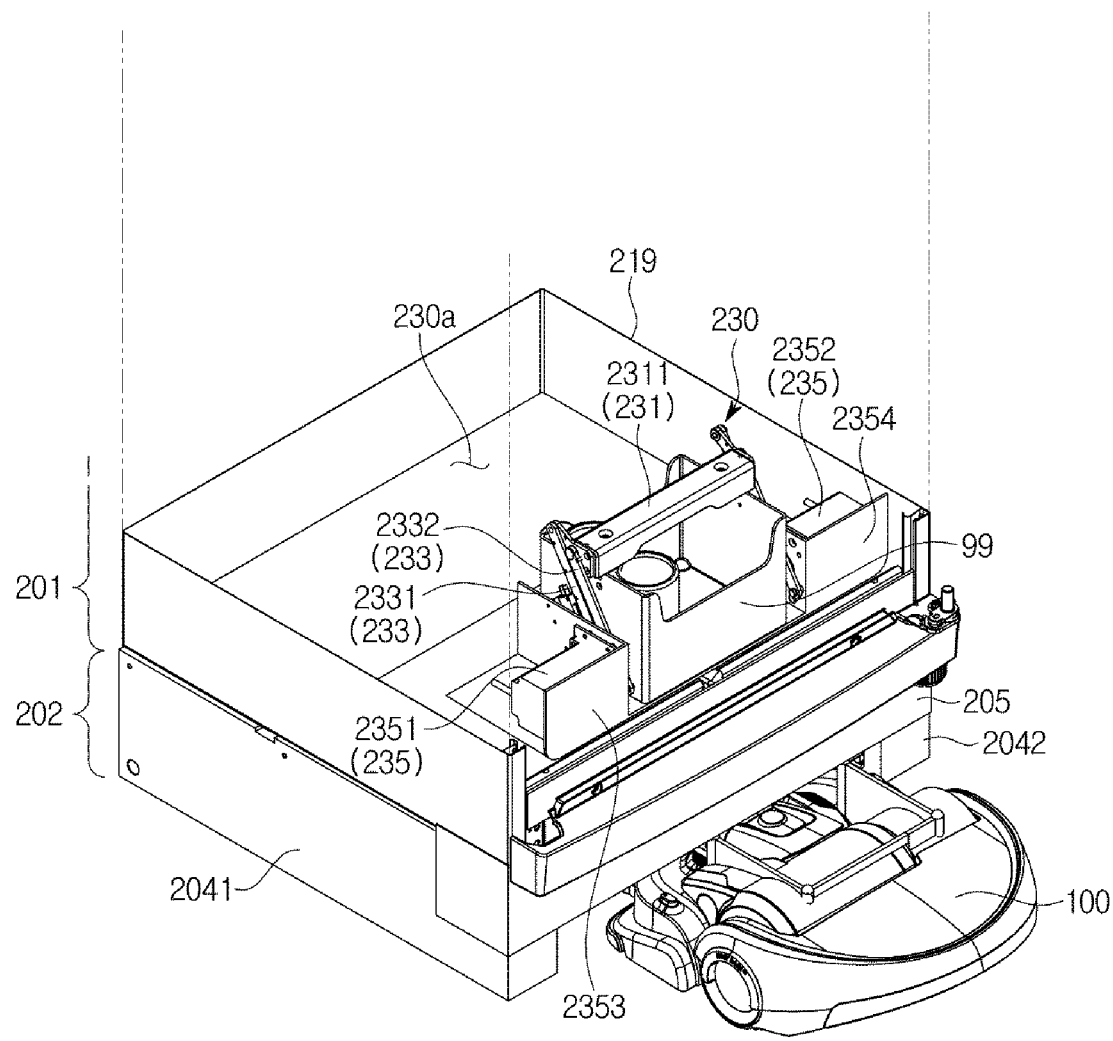
FIG. 12 is a first view illustrating an operation of the container provider mounting the container on the robot cleaner.
Figure 14:
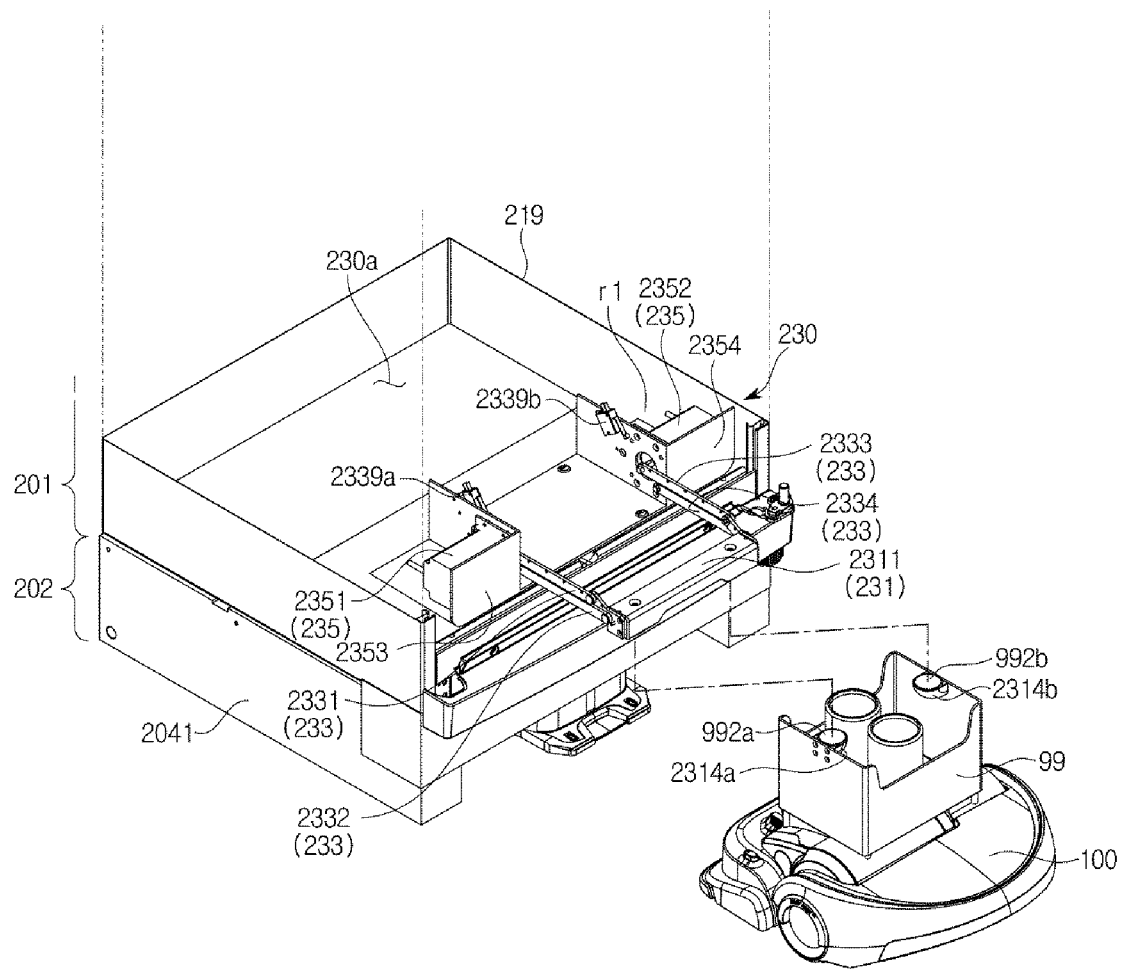
FIG. 14 is a third view illustrating the operation of the container provider mounting the container on the robot cleaner.
Figure 15:
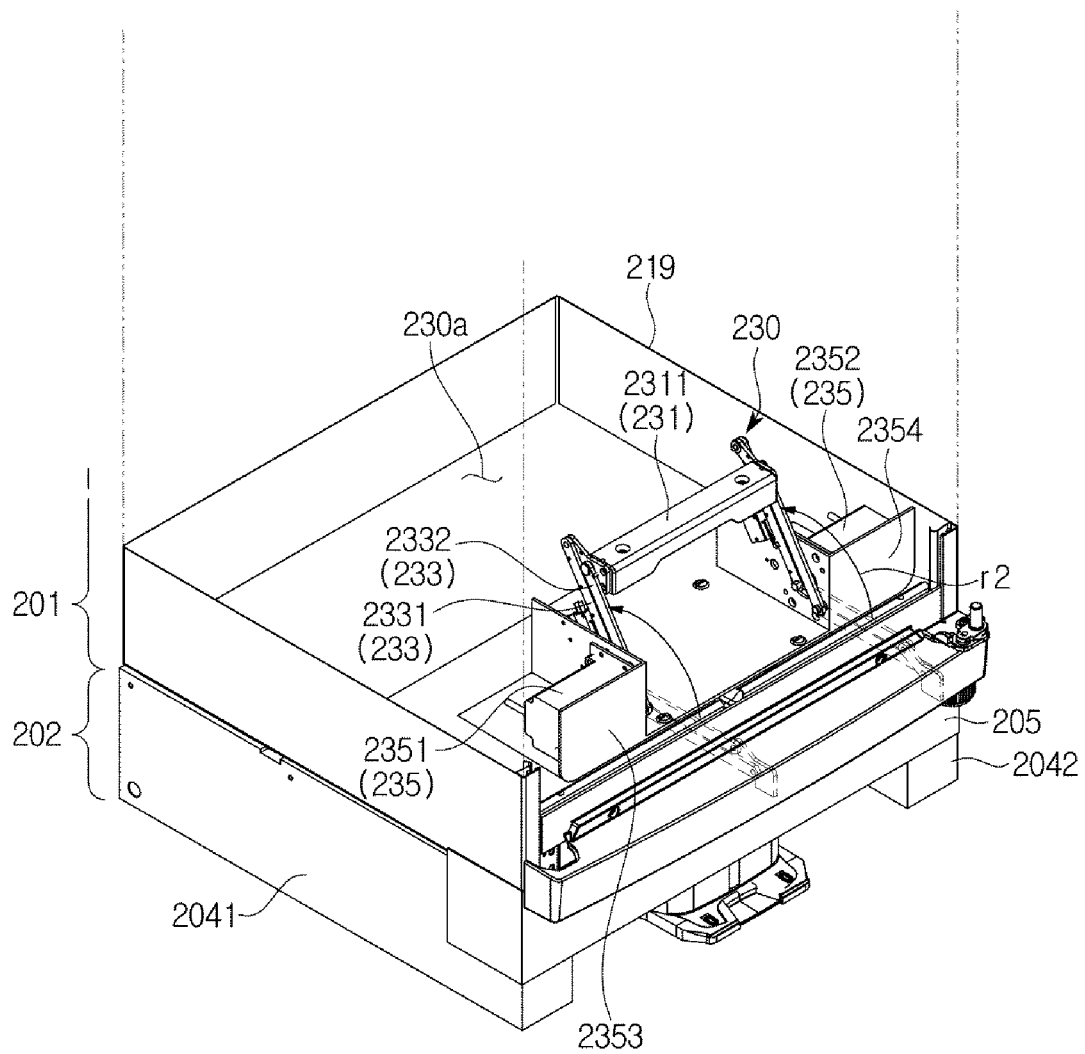
FIG. 15 is a view illustrating an example in which the container provider returns to an original state after the container is separated.

FIG. 12 is a first view illustrating an operation of the container provider mounting the container on the robot cleaner, and FIG. 13 is a second view illustrating the operation of the container provider mounting the container on the robot cleaner. FIG. 14 is a second view illustrating the operation of the container provider mounting the container on the robot cleaner, and FIG. 15 is a view illustrating an example in which the container provider returns to an original state after the container is separated.

As shown in FIG. 12, when the position guide device 300 is disposed at the point X2 exposed outside the refrigerator 200 and the robot cleaner 100 is mounted on the position guide device 300, power is supplied to the first driver 2351 and the second driver 2352 and the first driver 2351 and the second driver 2352 generate rotational driving forces according to the supplied power. In this case, the first driver 2351 and the second driver 2352, as shown in FIG. 13, may generate driving forces to allow the pivoting members 2331 to 2334 to pivot in a first rotational direction r1. Then, according to rotations of the pivoting members 2331 to 2334, the second container mounter 231 on which the container 99 is mounted also moves while rotating. In this case, since the pivoting members 2331 to 2334 are pivotably installed at the brackets 2312 and 2313 of the second container mounter 231 and the container 99 has its own weight, the container 99 may move to the robot cleaner 100 while being installed below the second container mounter 231 with minimized wobbles.

Meanwhile, before the first driver 2351 and the second driver 2352 operate, the door 210 of the refrigerator 200 may automatically operate to open and expose the container storage space 230a to the outside.

According to pivoting of the pivoting members 2331 to 2334, the container 99 may move to the first container mounter 140 of the robot cleaner 100. In this case, the pivoting members 2331 to 2334, as shown in FIG. 13, may be leveled with the ground or may slant at a certain angle with the ground, which is not 0.

When the container 99 moves to the first container mounter 140 of the robot cleaner 100, as shown in FIG. 14, the mounted portion 991 of the container 99 is separated from the mounting member 2314 of the second container mounter 231 and the container 99 is mounted on the first container mounter 140 of the robot cleaner 100. When the mounting member 2314 is embodied as an electromagnet, a current supplied to the mounting member 2314 may be cut off and accordingly the mounted portion 991 of the container 99 may be separated from the mounting member 2314 of the second container mounter 231 and the container 99 may be mounted on the first container mounter 140 of the robot cleaner 100.

As shown in FIG. 15, the robot cleaner 100 on which the container 99 is mounted may move according to predefined settings. For example, the robot cleaner 100 may move according to a predefined point according to a certain movement pattern or may move following a terminal device 400.

After the container 99 is separated, the container provider 230 may return to an original state. For example, the first driver 2351 and the second driver 2352, as shown in FIG. 13, may generate driving forces to allow the pivoting members 2331 to 2334 to pivot in a second rotational direction r2 that is a direction opposite to the first rotational direction r1. Then, the pivoting members 2331 to 2334 and the second container mounter 231 may move while rotating in the second rotational direction r2 until the pivoting members 2331 to 2334 arrive at the pivoting member return sensors 2339a and 2339b. When the pivoting members 2331 to 2334 arrive at the pivoting member return sensors 2339a and 2339b, the pivoting member return sensors 2339a and 2339b may output signals corresponding thereto or may cut off output of the signals and may stop operations depending on sensing results of the pivoting member return sensors 2339a and 2339b of the first driver 2351 and the second driver 2352. Accordingly, a returning operation of the container provider 230 is finished. When the returning operation of the container provider 230 is finished, the door 210 of the refrigerator 200 automatically operates to close the container storage space 230a.

Hereinafter, referring to FIG. 16, a flow of controlling of the container transfer system will be described.

Figure 16:
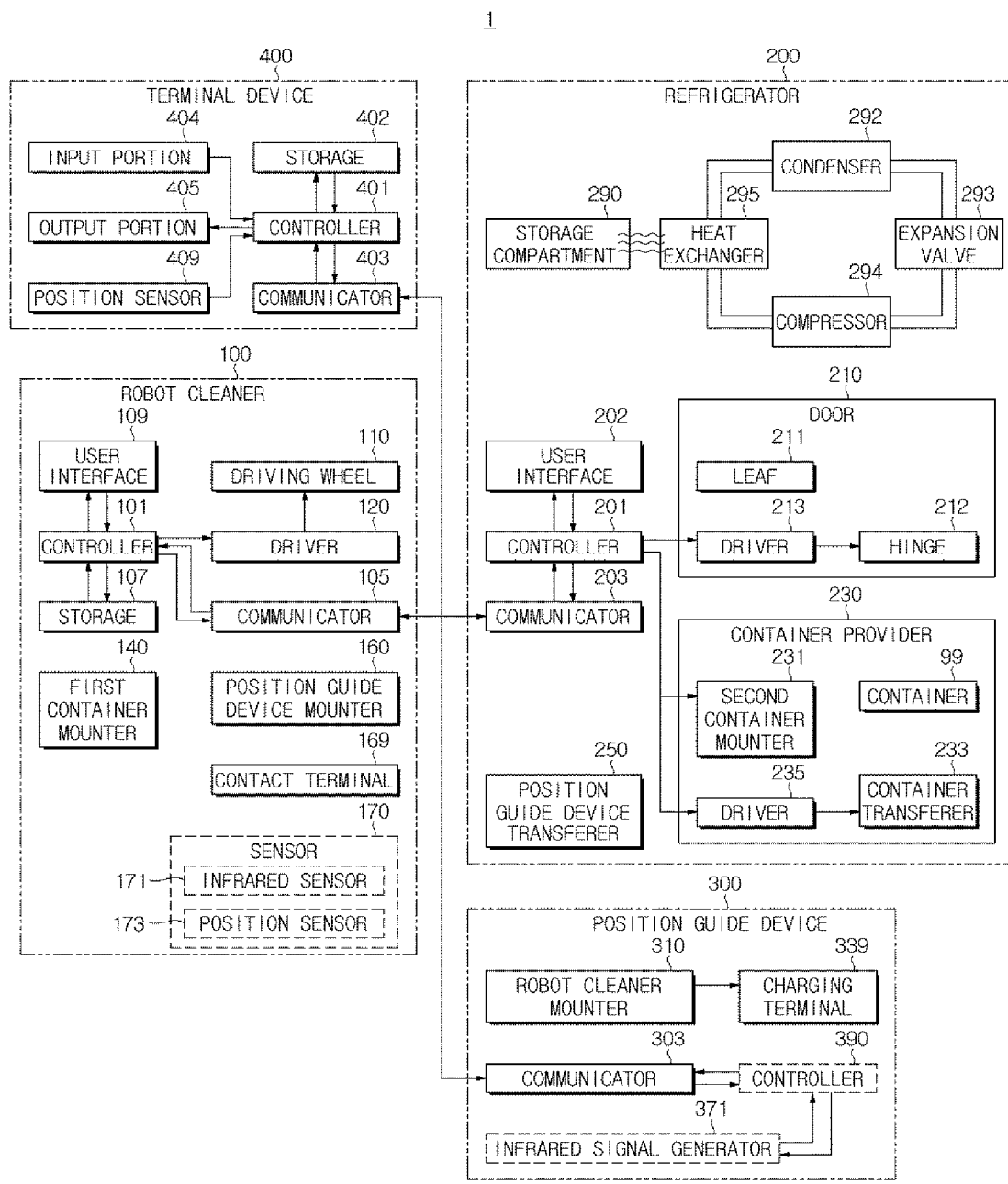
FIG. 16 is a control block diagram of the container transfer system.

FIG. 16 is a control block diagram of the container transfer system.

Referring to FIG. 16, the container transfer system 1 may include the robot cleaner 100, the refrigerator 200, the position guide device 300, and the terminal device 400.

The robot cleaner 100 may include a controller 101, a communicator 105, a storage 107, a user interface 109, the driving wheel 110, the driver 120, the first container mounter 140, the position guide device mounter 160, and the contact terminal 169. Some of them may be omitted depending on embodiments. Also, the robot cleaner 100 may further include additional components.

The controller 101 is provided to be controllable with respect to overall operations of the robot cleaner 100. The controller 101 may transmit a control signal to a driver 102 to allow the driver 102 to operate according to the control signal in such a way that the robot cleaner 100 may move in a certain direction and/or may rotate in a certain direction. The controller 101 may receive a signal transmitted from the user interface 109 and may determine an operation of the robot cleaner 100 according to the received signal. Also, the controller 101 may control driving of the robot cleaner 100 based on a control signal transmitted through the communicator 105 or various types of data.

The controller 101 may allow the robot cleaner 100 to move to the position guide device 300 depending on a communication result with the communicator 105 or a sensing result of a sensor 170. For example, the controller 101 may measure a relative distance between the position guide device 300 and/or the terminal device 400 and the robot cleaner 100 based on an electrical signal received from the communicator 105 and may determine a movement direction of the robot cleaner 100 based on a measurement result. Also, the controller 101 may measure a relative position and/or a relative distance between the position guide device 300 and/or the terminal device 400 and may allow the robot cleaner 100 to move based on a measuring result. Also, the controller 101 may sense a present position of the robot cleaner 100 according to a sensing result of a position sensor 173, may determine a movement direction of the robot cleaner 100 by comparing a target position with the sensed present position, and may control the robot cleaner 100 to move according to the determined movement direction. Here, the target position means a position to which the robot cleaner 100 will move and may include a position transmitted from the terminal device 400 and/or a position transmitted from the position guide device 300.

The controller 101 may include a processor capable of being embodied using one or more semiconductor chips and related components. The processor may be a micro controller unit (MCU) generally used at the robot cleaner 100.

The communicator 105 is provided to be communicable with communicators 203, 303, and 403 of other devices using a wired communication technology or a wireless communication technology. The communicator 105 may be embodied using at least one communication chip, an antenna, and a related circuit. The communicator 105 may receive information on a position of the position guide device 300 from the position guide device 300 or information on a position of the terminal device 400 from the terminal device 400. Also, the communicator 105 may receive a certain signal from the position guide device 300 and/or the terminal device 400 and the controller 101 may measure distances from the position guide device 300 and/or the terminal device 400 based on the received signal. Also, the communicator 105 may receive a container transfer command input through the terminal device 400 and the controller 101 may control the robot cleaner 100 to move to the position guide device 300 and then move to a certain target position when the container 99 is mounted, according to the container transfer command.

The communicator 105 may transmit a signal transmitted from a particular device to another device as necessary. For example, the communicator 105 may be provided to transmit a signal transmitted from the terminal device 400 to a docking device 300 and/or the refrigerator 200.

The storage 107 may temporarily or nontemporarily store various types of information related to the operation of the robot cleaner 100. The storage 107 may be embodied using a magnetic drum storage device, a magnetic disc storage device, or a semiconductor storage device. The storage 107 may store information on a position of the position guide device 300 or the terminal device 400 as necessary. Also, the storage 107 may store various types of information related to the operation of the robot cleaner 100, for example information on an operation pattern.

The user interface 109 is provided to receive various commands from a user or to provide various types of information to the user. The user interface 109 may include an input device and an output device such as a button or wheel. The output device may include a display for outputting an image, a sound output device for outputting a sound, a lighting device that outputs certain light in a certain pattern and the like. The user may directly input a container transfer command by operating the input device. In this case, the position sensor 173 of the robot cleaner 100 may sense a present position and the controller 101 may determine the sensed present position to be a target position to which the container 99 will be transferred.

Since the driving wheel 110, the driver 120, the first container mounter 140, and the position guide device mounter 160 have been described above, a detailed explanation thereof will be omitted.

The robot cleaner 100 may further include the sensor 170 depending on embodiments. The sensor 170 is provided to sense and collect information on surroundings related to the operation of the robot cleaner 100. According to one embodiment, the sensor 170 may include at least one of an infrared sensor 171 and the position sensor 173. The infrared sensor 171 may sense an infrared signal generated by an infrared signal generator 371 provided at the position guide device 300 and may output and transmit an electrical signal corresponding a sensing result to the controller 101. The position sensor 173 may collect information on a position of the robot cleaner 100 and may transmit a collecting result to the controller 101. The position sensor 173 may sense a present position of the robot cleaner 100 using a global positioning system (GPS).

According to one embodiment, the refrigerator 200 may include a controller 201, a user interface 202, the communicator 203, the door 210, the container provider 230, the position guide device transferer 250, the storage compartment 290, the heat exchanger 295 which performs a refrigeration cycle to supply cold air to the storage compartment 290, the condenser 292, the expansion valve 293, and the compressor 294. Some of them may be omitted according to a consideration of a designer, and additional components may be further added to the refrigerator 200.

The controller 201 may control overall operations of the refrigerator 200. For example, the controller 201 may transmit a control signal to at least one of the driver 213 of the door 210, the second container mounter 231 and the driver 235 of the container provider 230, and the driver 2570 of the position guide device transferer 250 to control them 213, 231, 235, and 2570 to automatically perform a necessary operation. In detail, for example, the controller 201 transmits a control signal to the driver 213 of the door 210 to allow the hinge to automatically pivot according to an operation of the driver 213 to move the leaf 211. Also, the controller 201 may directly transmit a control signal to the second container mounter 231, may transmit a control signal to a switch provided between the second container mounter 231 and a power source to allow the second container mounter 231 to mount or separate the container 99, or may transmit a control signal to the driver 235 of the container provider 230 to allow the container transferer 233 to transfer the container 99 to the outside of the refrigerator 200.

The controller 201 may include a processor capable of being embodied using one or more semiconductor chips and related components. The processor may be embodied using an MCU generally used at the refrigerator 200.

The communicator 203 performs communication with the communicators 105, 303, and 403 of other devices using a wired communication technology or a wireless communication technology. The communicator 203 may be embodied using at least one communication chip, an antenna, and a related circuit. The communicator 203 may receive information on whether the robot cleaner 100 is mounted on the position guide device 300 from the robot cleaner 100 and/or the position guide device 300 and may transmit the received information to the controller 201. According to the received information, the controller 201 may control the driver 213 of the door 210, the second container mounter 231 of the container provider 230, and/or the driver 235 of the container provider 230 to sequentially operate. Like the communicator 105 of the robot cleaner 100, the communicator 203 may be provided to transmit a signal or data transmitted from any one device to another device depending on embodiments.

The user interface 202 is provided to receive various commands related to controlling of the refrigerator 200 from a user or to provide various types of information related to the refrigerator 200 to the user. The user may directly input various commands with respect to the driver 213 of the door 210, the driver 235 of the container provider 230, and/or the driver 2570 of the position guide device transferer 250 through the user interface 202. Also, the user may give a container transfer command through the user interface 202.

Since the door 210, the container provider 230, the position guide device transferer 250, the storage compartment 290, the heat exchanger 295, the condenser 292, the expansion valve 293, and the compressor 294 have been described above, a detailed explanation thereof will be omitted.

According to one embodiment, the position guide device 300 may include the communicator 303, the robot cleaner mounter 310, and a charging terminal 339.

The communicator 303 is provided to be communicable with communicators 105, 203, and 403 of other devices using a wired communication technology or a wireless communication technology. As described above, the communicator 303 may be embodied using a communication chip, an antenna, and a related circuit. The communicator 105 may receive a container transfer command input through the terminal device 400, may transmit a return command to the robot cleaner 100 corresponding to the container transfer command, and may transmit a command with respect to controlling a movement of the position guide device 300 to the refrigerator 200. Also, when the robot cleaner 100 returns, a command with respect to beginning an operation of the container provider 230 may be transmitted to the refrigerator 200.

Since the robot cleaner mounter 310 and the charging terminal 339 have been described above, hereinafter a detailed explanation thereof will be omitted.

The position guide device 300 may further include a controller 390 as necessary. The controller 390 is provided to control various operations of the position guide device 300. For example, the controller 390 may generate and transmit control signals with respect to the robot cleaner 100 and/or the refrigerator 200, corresponding to the container transfer command. Depending on embodiments, the controller 390 may control the infrared signal generator 371.

The position guide device 300 may further include the infrared signal generator 371. The infrared signal generator 371 may output and discharge an infrared signal in a certain pattern. Depending on embodiments, the infrared signal generator 371 may output a plurality of infrared signals in different patterns. The output infrared signal may be sensed by the infrared sensor 171 of the robot cleaner 100, and the controller 101 of the robot cleaner 100 may measure a relative distance and/or a relative position from the position guide device 300 based on the infrared signal sensed by the infrared sensor 171 and may control the robot cleaner 100 to move to the position guide device 300 based on a measuring result.

The terminal device 400 may include a controller 401, a storage 402, the communicator 403, an input portion 404, and an output portion 405 and may further include a position sensor 409 as necessary.

The controller 401 is provided to control overall operations of the terminal device 400. For example, the controller 401 may control a control signal corresponding to a user command input through the input portion 404 to be generated and may control the generated control signal to be transmitted to the robot cleaner 100, the refrigerator 200, and/or the position guide device 300 through the communicator 403. For example, when a container transfer command is input, the controller 401 may generate a control command corresponding to each of the devices 100 to 300 in response to the container transfer command and may control the generated control command to be transmitted to each of the devices 100 to 300. In this case, the controller 401 may generate only a control command with respect to one device, for example, the position guide device 300. When only a control command with respect to one device is generated as described above, the one device that receives the control command may generate a new control command in response to the control command and may transmit the generated control command to another device, for example, the robot cleaner 100 and/or the refrigerator 200.

The controller 401 may include a processor capable of being embodied using one or more semiconductor chips and related components. Also, the controller 401 may control the communicator 403 to emit electromagnetic waves. In this case, the robot cleaner 100 may move following the terminal device 400 using the emitted electromagnetic waves.

The storage 402 may temporarily or nontemporarily store various types of information related to an operation of the terminal device 400, for example, a present position of the terminal device 400 sensed by the position sensor 409. Also, the storage 402 may store a program with respect to a method of transferring and retrieving the container 99. The program with respect to the method of transferring and retrieving the container 99 is executable by the controller 401.

The communicator 403 is provided to be communicable with the communicators 105, 203, and 303 of the robot cleaner 100, the refrigerator 200, and/or the position guide device 300. The communicator 403 may be embodied using at least one communication chip, an antenna, and a related circuit.

The input portion 404 may receive various commands from a user. For example, the input portion 404 may receive a container transfer command from a user. The input portion 404 may be embodied using at least one of various input means such as a physical button, a keyboard, a keypad, a resistive touch sensor, a capacitive touch sensor, an infrared touch sensor, a trackball, a trackpad, a joystick and the like.

The output portion 405 is provided to output various types of information using an image, a sound, and/or light in various patterns to the user. The output portion 405 may include a display, a sound output device, and/or a lighting device. When the input portion 404 is embodied using a touch sensor, the output portion 405 may be a display and the display may display a guide image for guiding a touch operation.

The position sensor 409 may sense a present position of the terminal device 400. The position sensor 409 may be embodied by employing a GPS. The position of the terminal device 400 sensed by the position sensor 409 may be used as a target position of the robot cleaner 100.

Hereinafter, referring to FIGS. 17 to 25, one embodiment of a container transfer method will be described.

Figure 17:
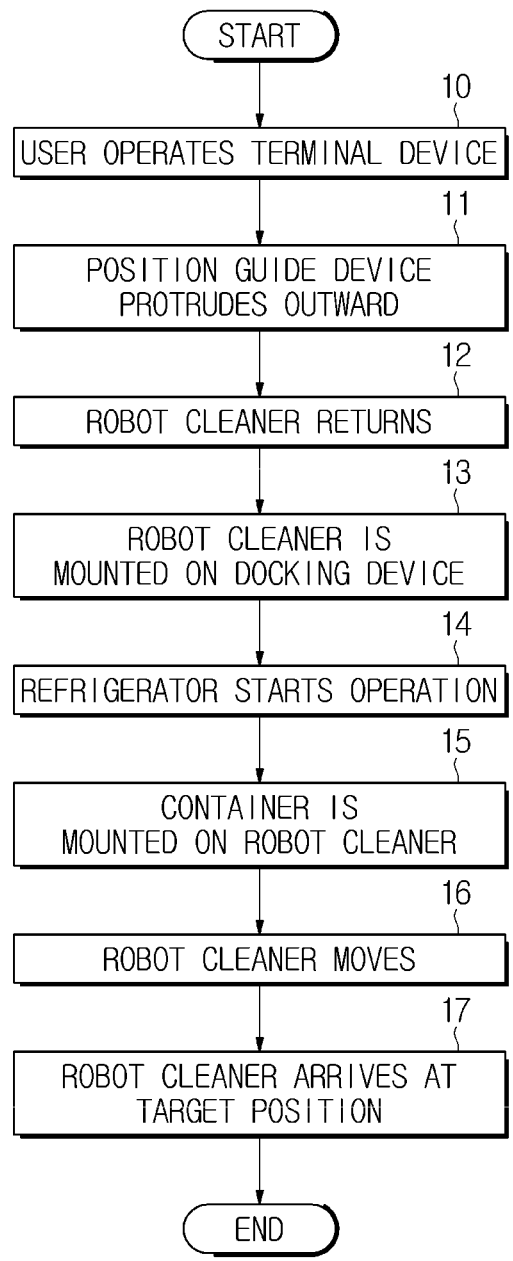
FIG. 17 is a first flowchart illustrating one embodiment of the container transfer method.
Figure 18:
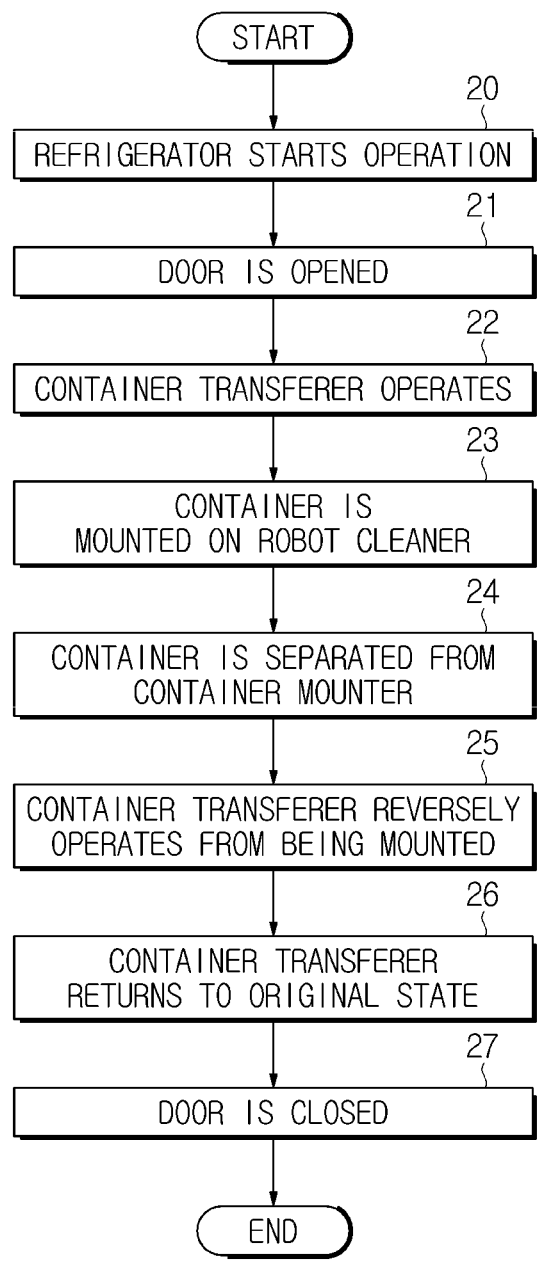
FIG. 18 is a second flowchart illustrating one embodiment of the container transfer method.

FIG. 17 is a first flowchart illustrating one embodiment of the container transfer method, and FIG. 18 is a second flowchart illustrating one embodiment of the container transfer method. FIGS. 19 to 25 are first to seventh views illustrating the container transfer method. Although the container transfer method in a case in which a mobile body is the robot cleaner 100, a container storage device is the refrigerator 200, the position guide device 300 is a robot cleaner charger, and the terminal device 400 is a touch-operable smart phone is illustrated in FIGS. 17 to 25, the mobile body, the container storage device, the position guide device, and the terminal device may be replaced by other devices considerable by a designer in addition thereto.

Figure 19:
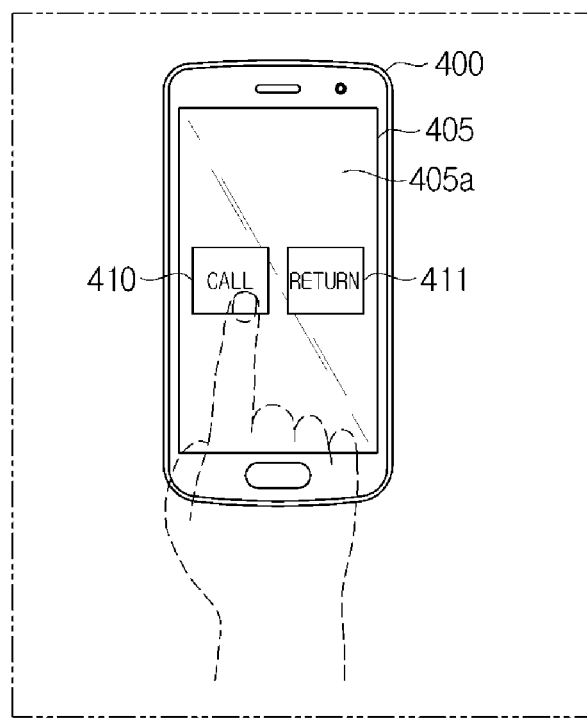
FIG. 19 is a first view illustrating the container transfer method.

Referring to FIGS. 17 to 19, when a user operates the terminal device 400, the terminal device 400 may execute a program with respect to a method of transferring and retrieving the container 99, and as a result of executing the program, the output portion 405 of the terminal device 400 may display an input screen 405a for inputting a transfer and retrieval command. At least one of a transfer command input button 410 for receiving a transfer command and a retrieval command input button 411 for receiving a retrieval command may be displayed on the input screen 405a.

When the user operates the transfer command input button 410 through a touch operation and the like (10), the terminal device 400 may transmit a control signal corresponding to the transfer command to the robot cleaner 100, the refrigerator 200, and/or the position guide device 300. In this case, the control signal may be directly transmitted from the terminal device 400 to the robot cleaner 100, the refrigerator 200, and/or the position guide device 300 or may be transmitted via any one of the robot cleaner 100, the refrigerator 200, and the position guide device 300. The robot cleaner 100, the refrigerator 200, and/or the position guide device 300 enter a standby state for performing operations according to the received control signal.

Figure 20:
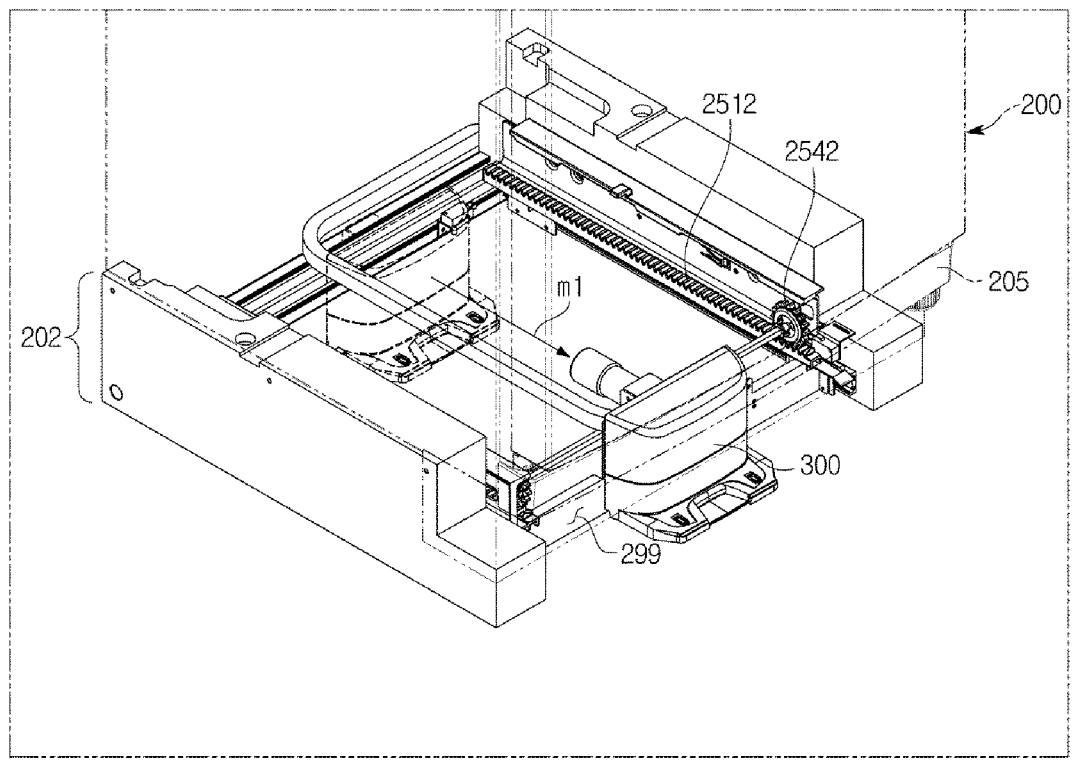
FIG. 20 is a second view illustrating the container transfer method.

As shown in FIG. 20, when the position guide device 300 is stored and disposed in a bottom end of the refrigerator 200, the position guide device 300 may move forward in the movement space 299 and may protrude outward (11, m1). The position guide device 300 may move to the shielding frame 205.

Figure 21:
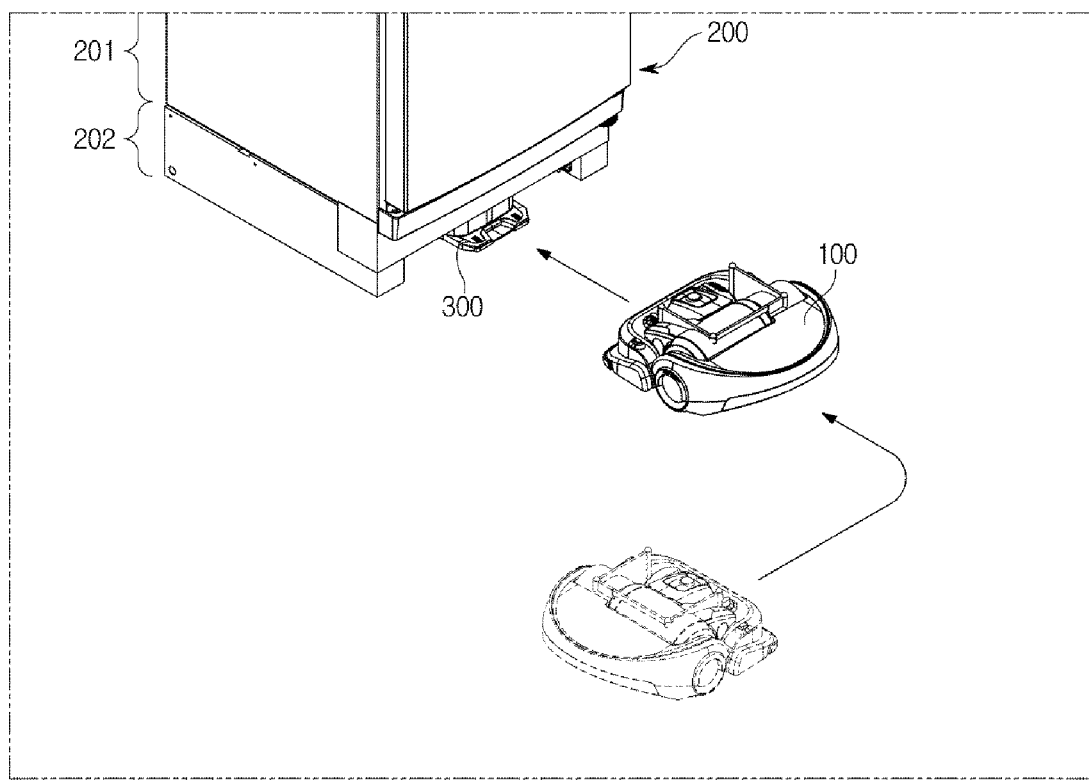
FIG. 21 is a third view illustrating the container transfer method.
Figure 22:
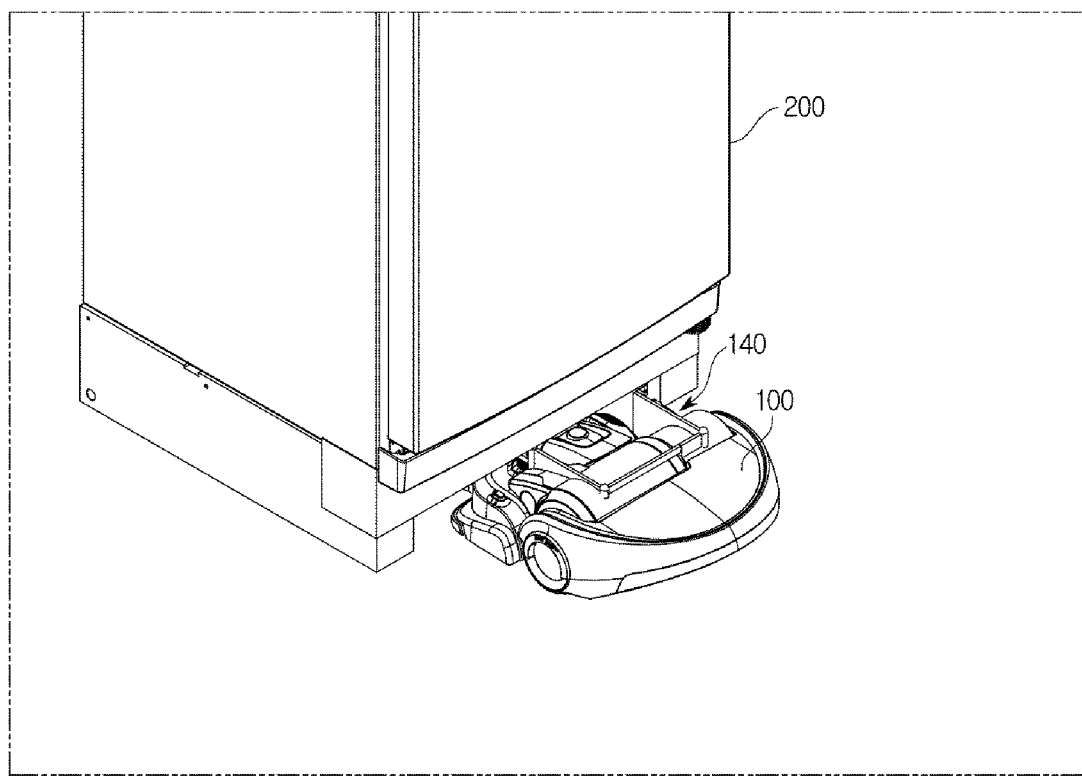
FIG. 22 is a forth view illustrating the container transfer method.

The robot cleaner 100, as shown in FIG. 21, performs a returning operation to the position guide device 300 (12). In this case, the returning operation of the robot cleaner 100 may be started simultaneously with movement of the position guide device 300 and may be started after the position guide device 300 starts a movement. Also, the returning operation of the robot cleaner 100 may be started after the position guide device 300 finishes a movement operation. The robot cleaner 100 may determine where the position guide device 300 is disposed by performing a short-range communication with the position guide device 300 or receiving an infrared signal transmitted from the position guide device 300 and may move according to a determination result to return to the position guide device 300. The robot cleaner 100 that returns to the position guide device 300, as shown in FIG. 22, is mounted on the position guide device 300 entirely or partially exposed in front of the door 210 of the refrigerator 200.

Figure 23:
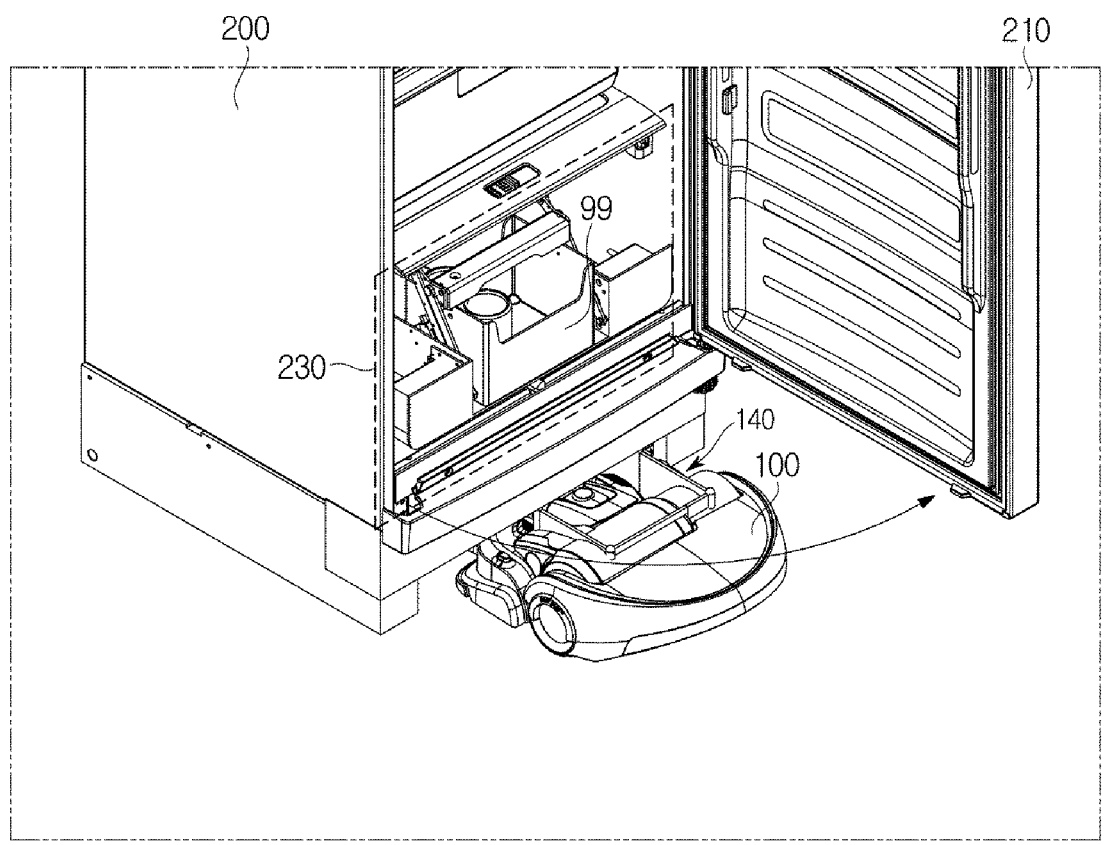
FIG. 23 is a fifth view illustrating the container transfer method.
Figure 24:
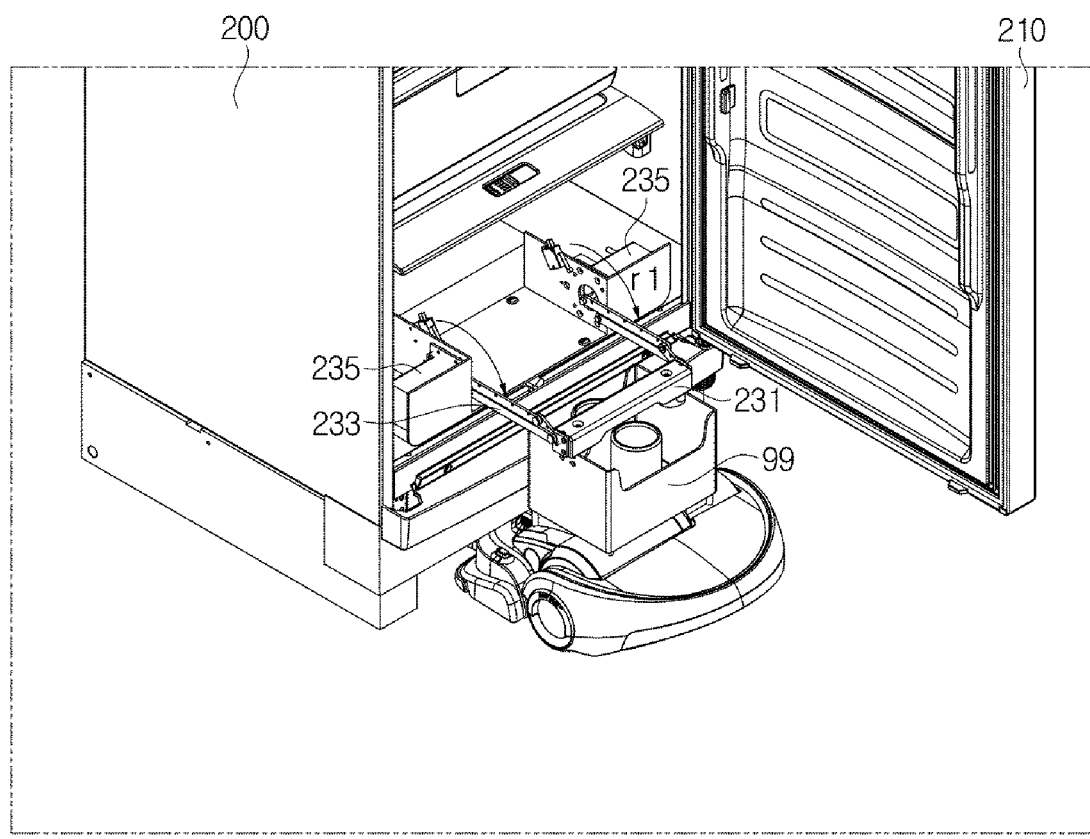
FIG. 24 is a sixth view illustrating the container transfer method.

When the robot cleaner 100 is mounted on the position guide device 300, as shown in FIGS. 23 and 24, the refrigerator 200 starts an operation (14) and the container 99 is mounted on the robot cleaner 100 (15). A detailed operation of the refrigerator 200 will be described below.

Figure 25:
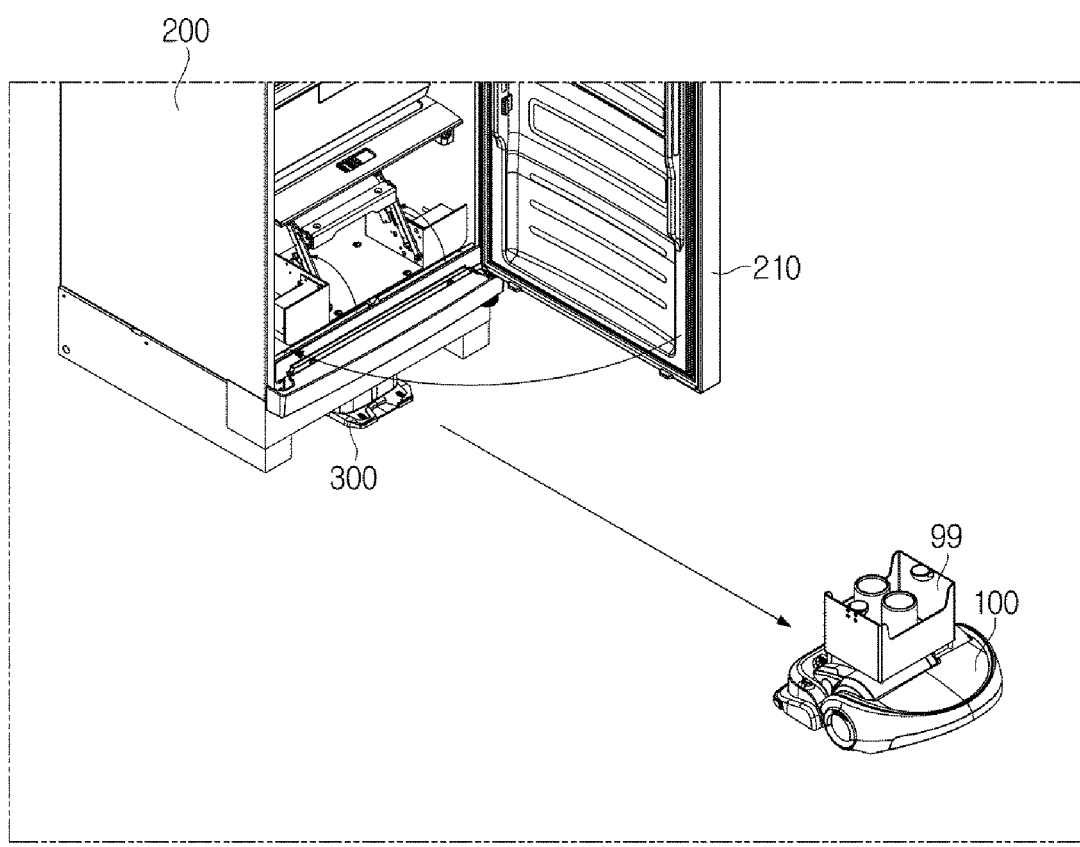
FIG. 25 is a seventh view illustrating the container transfer method.

When the container 99 is mounted on the robot cleaner 100, the robot cleaner 100, as shown in FIG. 25, starts a movement while the container 99 is mounted thereon (16). The robot cleaner 100 continuously moves until arriving at a target position. Here, the target position may be an initial position of the terminal device 400 or a position designated by the user using the terminal device 400. Also, the target position may be a present position of the terminal device 400. When the target position is the present position of the terminal device 400, the robot cleaner 100 may continuously perform communication with the terminal device 400 and may move following the terminal device 400.

Through the above-described method, the robot cleaner 100 may transfer the container 99 stored in the refrigerator 200 to the user, and accordingly, the user may conveniently and easily obtain various types of food and the like stored in the refrigerator 200.

As shown in FIG. 20, when the robot cleaner 100 is mounted on the position guide device 300, the refrigerator 200 starts an operation as shown in FIG. 18 (20).

As shown in FIG. 23, the door 210 of the refrigerator 200 moves or pivots first in a certain direction to be opened (21) and the container 99 and the container provider 230 provided in the refrigerator 200 are exposed. When the door 210 of the refrigerator 200 is opened, the container transferer 233 of the container provider 230 pivots in a certain direction r1 by a driving force of the driver 235 and transfers the second container mounter 231 on which the container 99 is mounted to the first container mounter 140 at a top end of the robot cleaner 100 (22).

When the container 99 arrives at the first container mounter 140 at the top end of the robot cleaner 100 as shown in FIG. 24 (23), sequentially, the second container mounter 231 and the container 99 are separated from each other (24) and accordingly the container 99 is mounted on the first container mounter 140 of the robot cleaner 100.

When the container 99 is separated from the second container mounter 231, the driver 235 applies a driving force in a direction opposite to that when moving the container 99 to the outside, to the container transferer 233 and accordingly the container transferer 233 pivots in a direction r2 opposite to the certain direction r1 as shown in FIG. 25 (25) and returns to the initial position (26).

When the container transferer 233 returns to the initial position, the door 210 automatically moves or pivots in a direction opposite to that of being opened to be closed (27). Accordingly, the refrigerator 200 may adequately provide the container 99 to the robot cleaner 100 and may also adequately store the container transferer 233 and close the door 210 after the container 99 is provided to the robot cleaner 100.

Hereinafter, referring to FIGS. 26 to 36, one embodiment of a container retrieval method will be described.

Figure 26:
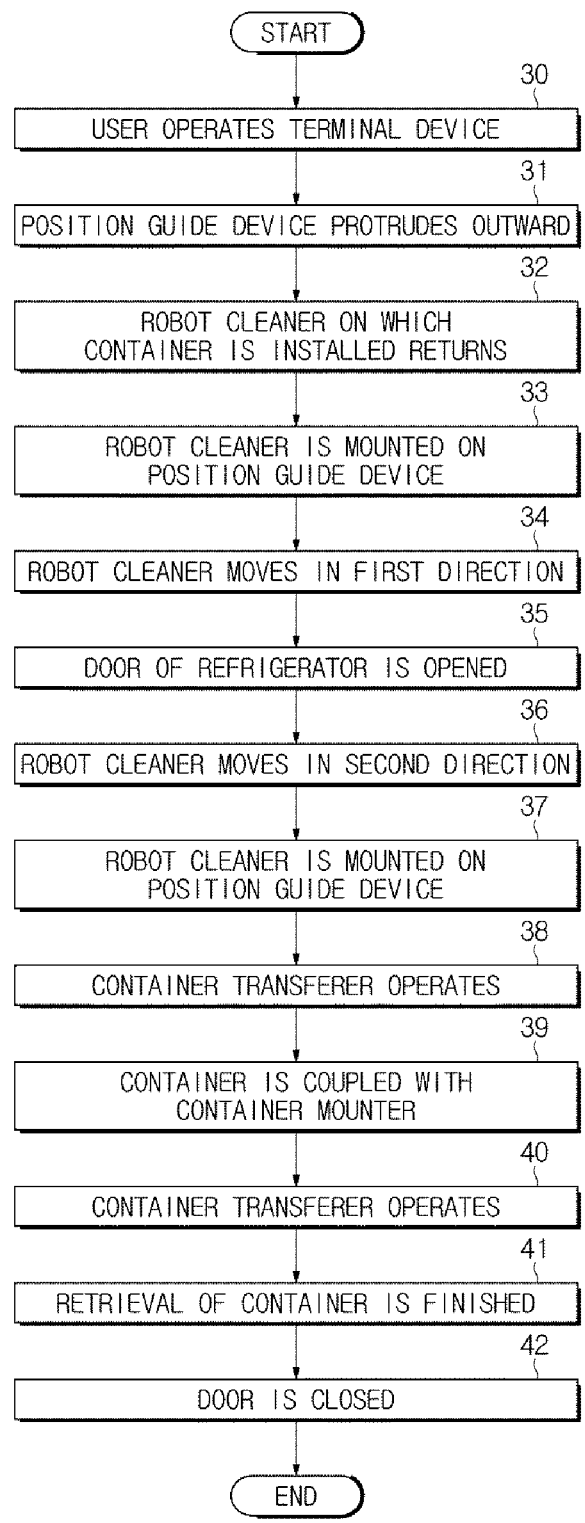
FIG. 26 is a flowchart illustrating one embodiment of the container retrieval method.

FIG. 26 is a flowchart illustrating one embodiment of the container retrieval method. FIGS. 27 to 36 are first to tenth views illustrating one embodiment of the container retrieval method.

Figure 27:
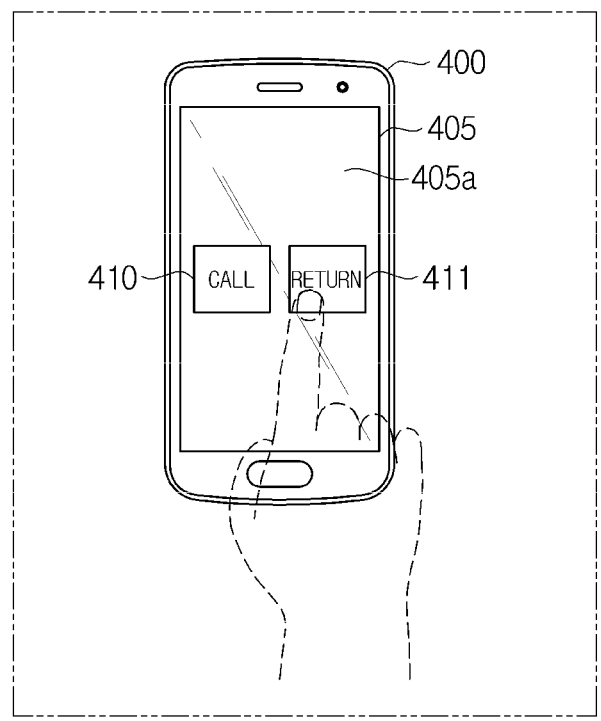
FIG. 27 is a first view illustrating one embodiment of the container retrieval method.

Referring to FIGS. 26 and 27, when a user operates the terminal device 400, the terminal device 400 executes the program with respect to the method of transferring and retrieving the container 99 like the case of FIG. 19. The user may operate the retrieval command input button 411 displayed on the input screen 405a using a method such as a touch operation and the like (30), and accordingly, the terminal device 400 may receive the retrieval command and may generate and transmit a control signal corresponding to the retrieval command to the robot cleaner 100, the refrigerator 200, and/or the position guide device 300. Like the case of the transfer command, a control signal may be transmitted to the robot cleaner 100, the refrigerator 200, and the position guide device 300.

Figure 28:
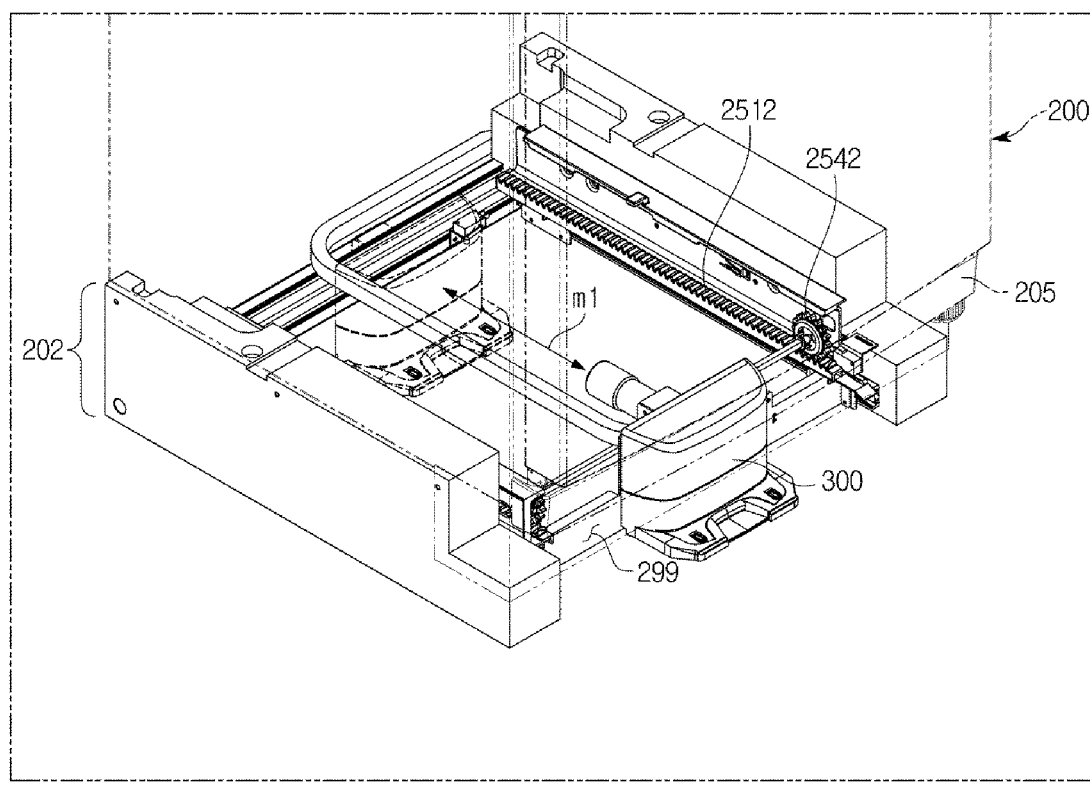
FIG. 28 is a second view illustrating one embodiment of the container retrieval method.

As shown in FIG. 28, when the position guide device 300 is stored and disposed in the bottom end portion 202 of the refrigerator 200, the position guide device 300 may move forward (m1) to the shielding frame 205 in the movement space 299 and may stop. Accordingly, the position guide device 300 may entirely or partially protrude (31).

Figure 29:
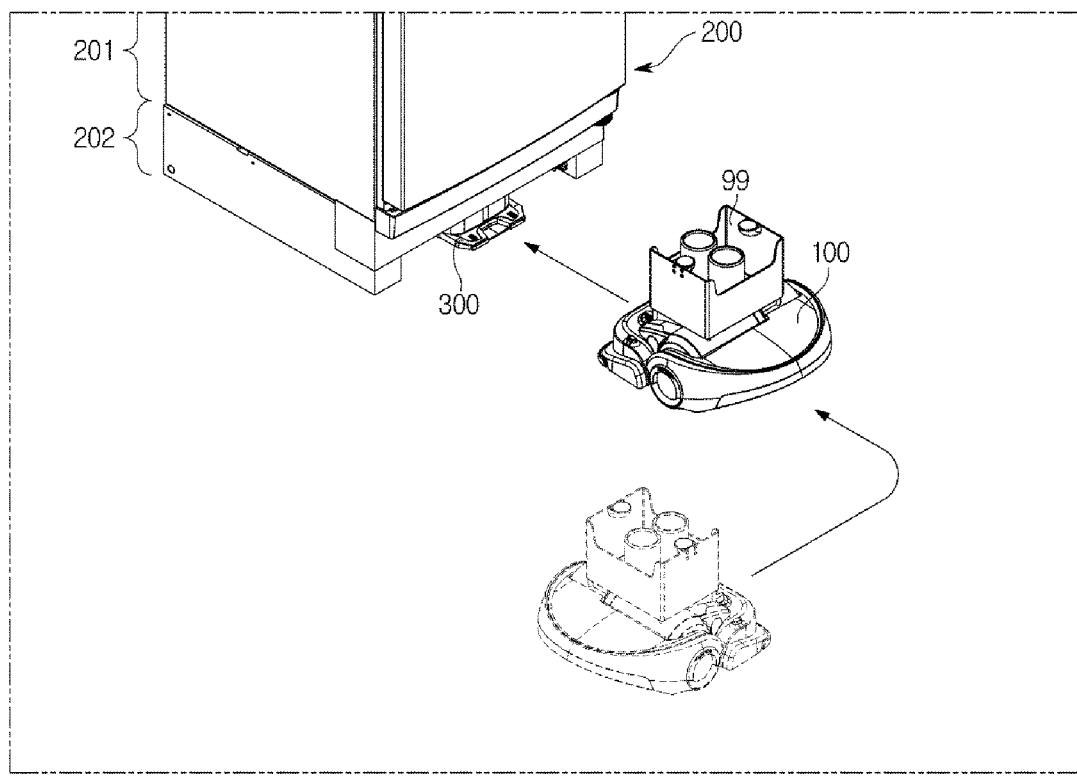
FIG. 29 is a third view illustrating one embodiment of the container retrieval method.

The robot cleaner 100, as shown in FIG. 29, may return to the position guide device 300 with the container 99 (32). In this case, the returning operation of the robot cleaner 100, like the above description with reference to FIG. 21, may be performed at the same time or at different times with the movement of the position guide device 300. The container 99 may be in a state of being mounted on the first container mounter 140 of the robot cleaner 100.

Figure 30:
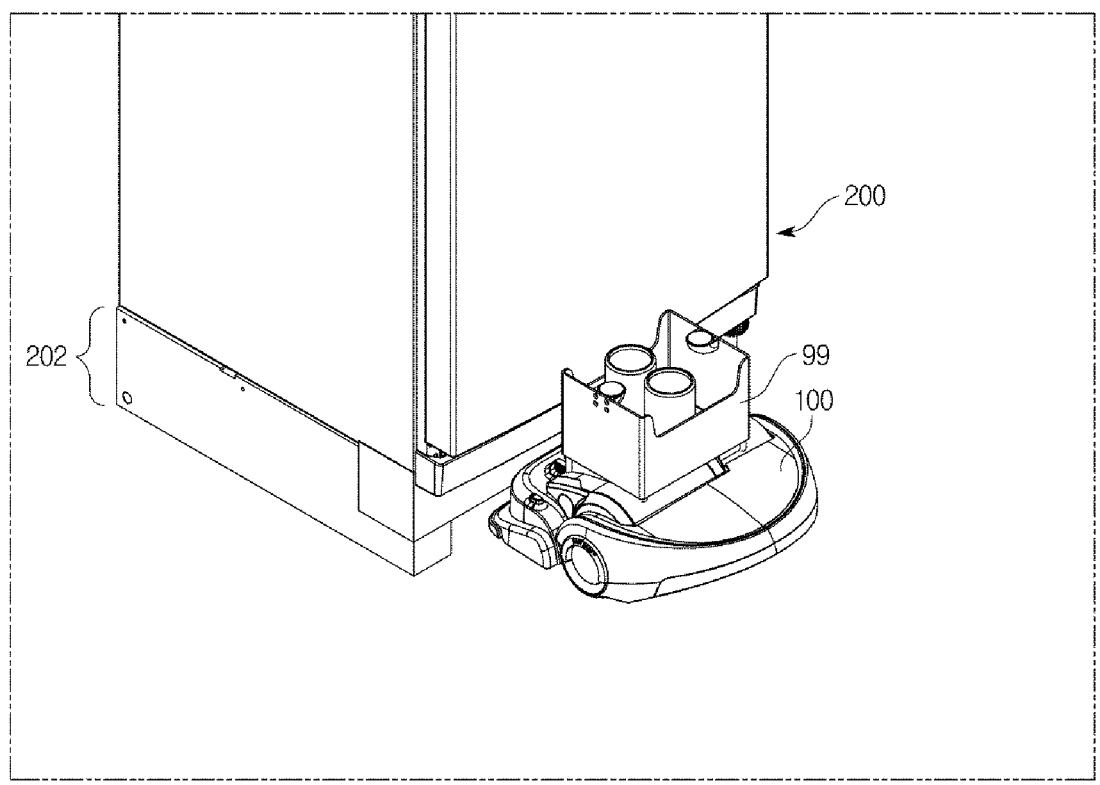
FIG. 30 is a forth view illustrating one embodiment of the container retrieval method.

The robot cleaner 100, as shown in FIG. 30, is mounted on the position guide device 300 first (33).

Figure 31:
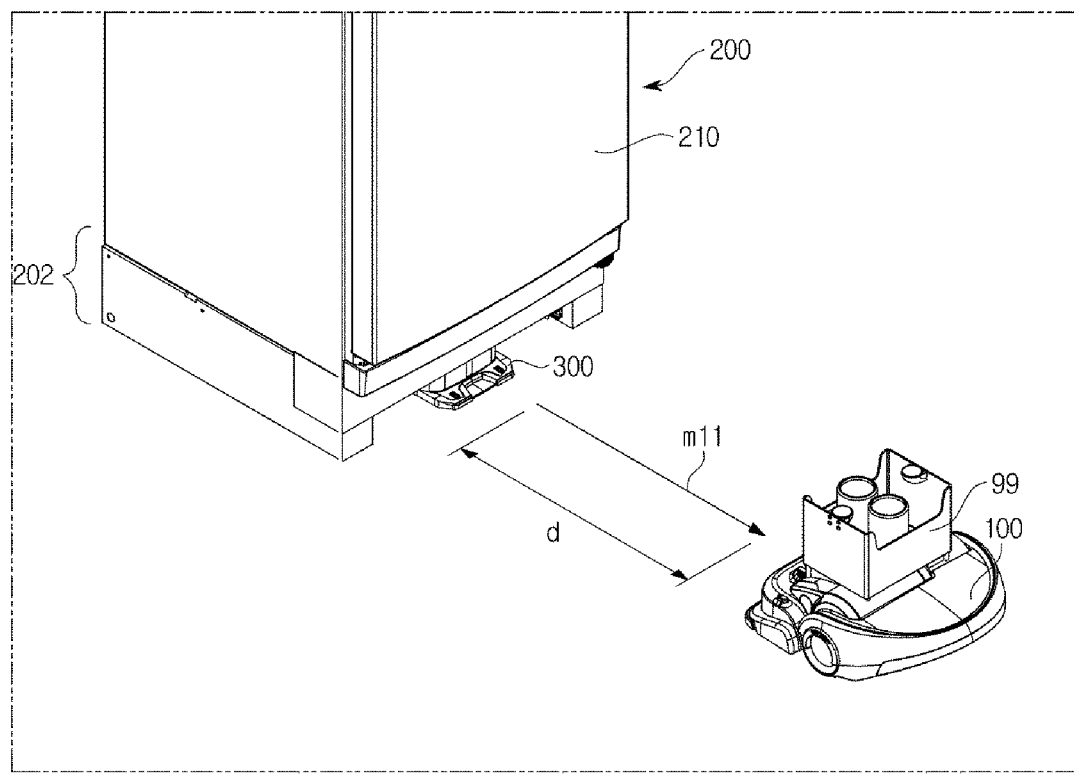
FIG. 31 is a fifth view illustrating one embodiment of the container retrieval method.

Sequentially, to open the door 210, the robot cleaner 100 may be separated from the position guide device 300 and may move by a certain distance d in a first direction m11 as shown in FIG. 31 (34). Here, the certain distance d means a distance as long as not to allow the door 210 to collide with the container 99 while the door 210 of the refrigerator 200 is opened and the first direction m11 means a direction in which the robot cleaner 100 and the refrigerator 200 may become far away from each other. In this case, a plurality of such driving wheels 1101 and 1102 of the robot cleaner 100 rotate at a regular speed in such a way that the robot cleaner 100 may be controlled to move in the one direction m11 without rotation.

Figure 32:
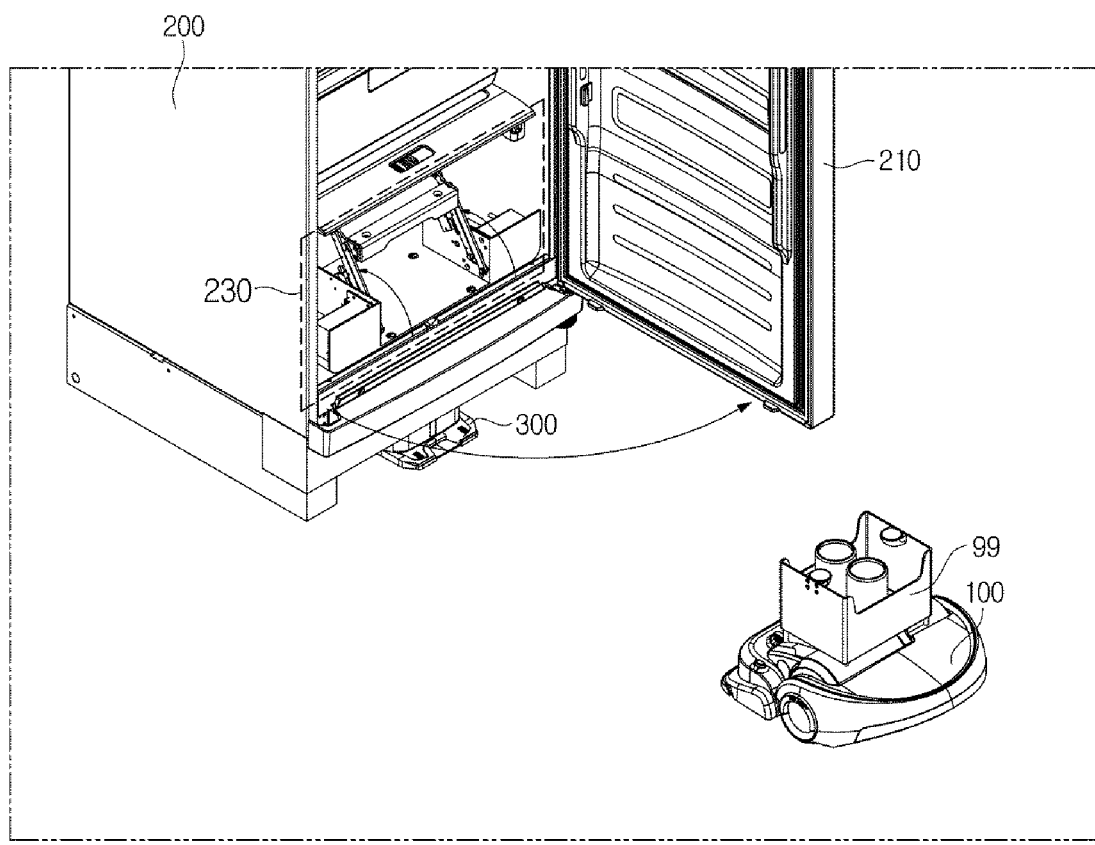
FIG. 32 is a sixth view illustrating one embodiment of the container retrieval method.

When the robot cleaner 100 moves by the certain distance d, as shown in FIG. 32, the door 210 of the refrigerator 200 is opened (35). In this case, the refrigerator 200 may determine that the robot cleaner 100 has moved by the adequate distance d when a certain time has passed and may open the door 210. Otherwise, the refrigerator 200 may receive a signal with respect to completion of movement by the certain distance d from the robot cleaner 100 and may open the door 210 corresponding to the reception of the signal.

Figure 33:
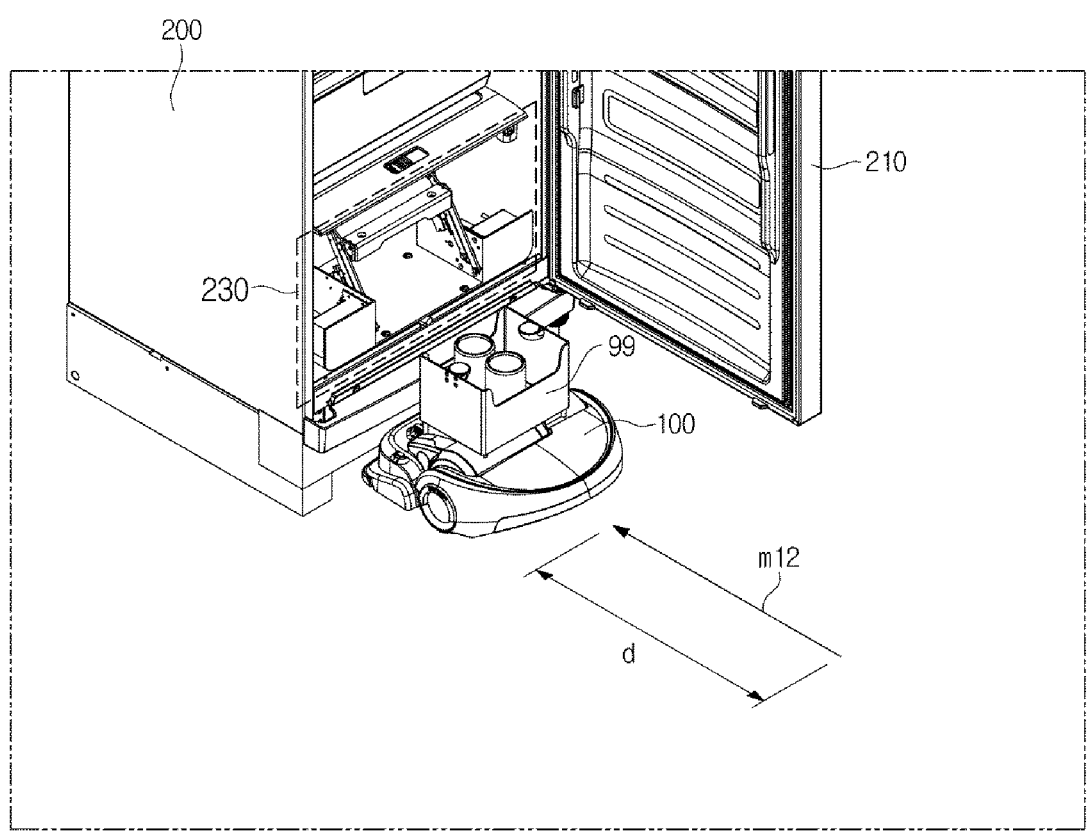
FIG. 33 is a seventh view illustrating one embodiment of the container retrieval method.

Referring to FIG. 33, the robot cleaner 100 moves in a second direction m12 opposite to the first direction m11 to return to the position guide device 300 (36) and is mounted on the position guide device 300 (37). In this case, when moving in the first direction m11, the robot cleaner 100 may return to the position guide device 300 by moving in the second direction m12 by the same movement distance as the movement distance d. In this case, the plurality of driving wheels 1101 and 1102 of the robot cleaner 100 may rotate in an opposite direction at the same speed like when getting far away from the refrigerator 200 to allow the robot cleaner 100 to adequately return to the position guide device 300.

Figure 34:
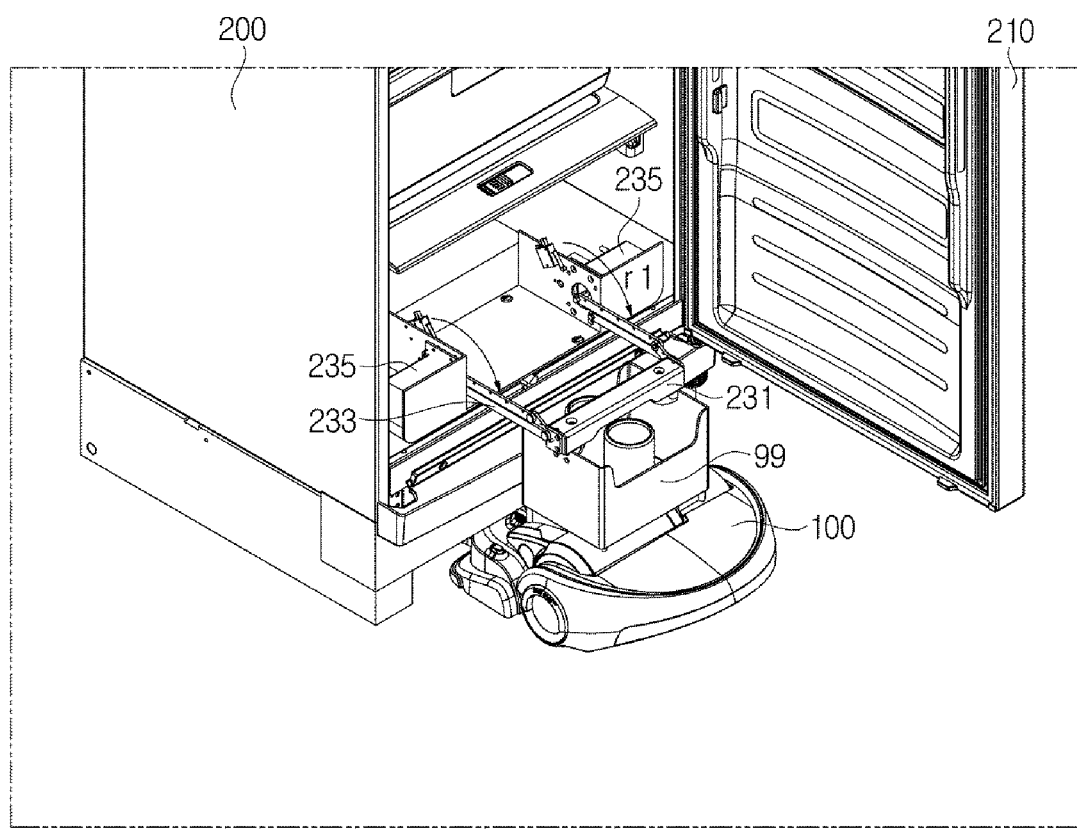
FIG. 34 is an eighth view illustrating one embodiment of the container retrieval method.

Sequentially, as shown in FIG. 34, when the robot cleaner 100 is mounted on the position guide device 300, the container transferer 233 of the container provider 230 pivots in a certain direction r1 due to a driving force of the driver 235 until arriving at a position where the second container mounter 231 mounts the container 99 (38). The container 99 is coupled with and mounted on the second container mounter 231 using a magnetic field and the like (39). When the container 99 is mounted on the second container mounter 231, the container transferer 233 pivots in a direction r2 opposite to the certain direction r1 due to the driving force of the driver 235 (40).

Figure 35:
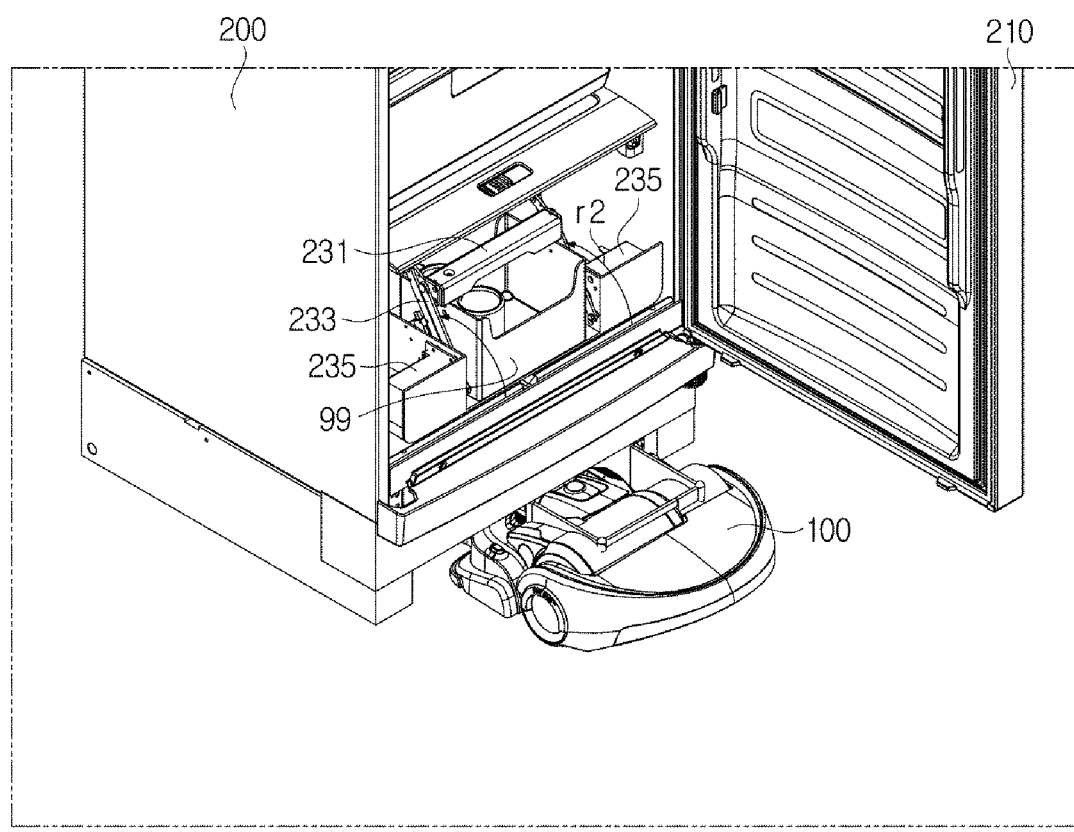
FIG. 35 is a ninth view illustrating one embodiment of the container retrieval method.

Accordingly, as shown in FIG. 35, the container 99 is retrieved to the container storage space 230a by the container transferer 233 (41). When the pivoting member return sensors 2339a and 2339b sense the pivoting members 2331 to 2334 of the container transferer 233, the container transferer 233 finishes operation and accordingly the container retrieval operation is finished (41).

Figure 36:
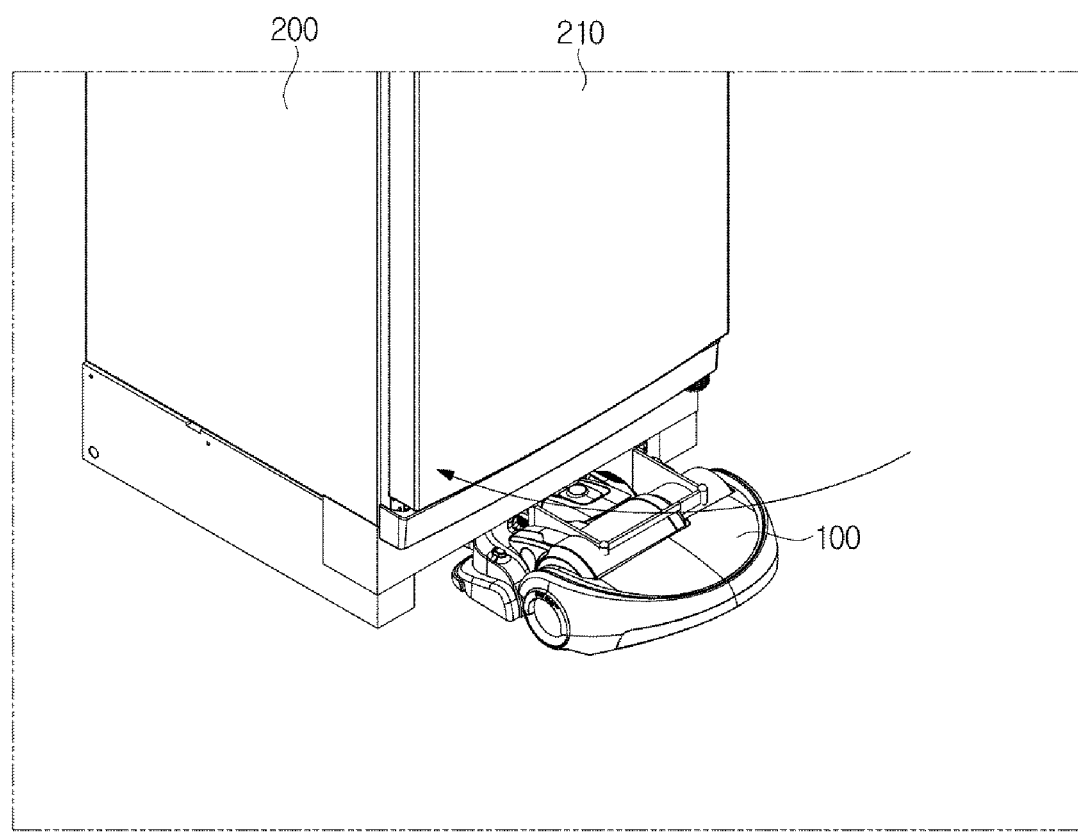
FIG. 36 is a tenth view illustrating one embodiment of the container retrieval method.

When the container retrieval operation is finished, as shown in FIG. 36, the door 210 is closed (42). Meanwhile, when the container retrieval operation is finished, the robot cleaner 100 may be separated from the position guide device 300 to perform a cleaning operation or may remain in a state of being mounted on the position guide device 300. When being mounted on the position guide device 300, the robot cleaner 100 may be charged.

According to the above-described robot cleaner, the refrigerator, the container transfer system, and the method of transferring and retrieving a container using the robot cleaner, there is provided an effect of increasing user convenience by transferring a container stored in a container storage device to a and allowing the container storage device to retrieve the container transferred to the user.

What is claimed is:

1. A method of transferring a container, comprising:
   returning a robot cleaner to a position guide device installed at a refrigerator;
   mounting the robot cleaner on the position guide device;
   transferring, by the refrigerator, a container stored in the refrigerator to mount the container on the robot cleaner; and
   moving the robot cleaner on which the container is mounted to a target position.

2. The method of claim 1, further comprising moving the position guide device stored in a bottom end of the refrigerator to be exposed outside the refrigerator.

3. The method of claim 2, wherein the position guide device is movable forward or backward by a position guide device transferer provided at a bottom end portion of the refrigerator.

4. The method of claim 3, wherein the position guide device transferer comprises a rack, a rotor that moves along the rack, and a position guide device driver that generates a driving force with respect to the rotor.

5. The method of claim 1, further comprising automatically opening a door of the refrigerator.

6. The method of claim 1, wherein the transferring, by the refrigerator, of the container stored in the refrigerator to mount the container on the robot cleaner comprises moving, by a container transferer, a container mounter on which the container is mounted to a top end of the robot cleaner and separating the container from the container mounter.

7. The method of claim 6, wherein the container comprises a mounted portion, and the container mounter comprises a mounting member on or from which the mounted portion is mountable or separable.

8. The method of claim 7, wherein the container transferer comprises at least one pivoting member pivotably coupled with the container mounter and a driver that rotates the pivoting member in at least one direction.

9. The method of claim 1, further comprising receiving, by a terminal device, a container transfer command.

10. The method of claim 9, further comprising:
    transferring the container transfer command to the position guide device; and
    transmitting, by the position guide device, a control signal corresponding to the container transfer command to at least one of the robot cleaner and the refrigerator.

11. The method of claim 9, further comprising transmitting, by the terminal device, information about a position of the terminal device together with the container transfer command,
    wherein the moving of the robot cleaner on which the container is mounted to the target position comprises setting the position of the terminal device to be the target position and moving the robot cleaner to the set target position.

12. The method of claim 1, wherein the moving of the robot cleaner on which the container is mounted to the target position comprises performing, by the robot cleaner, communication with a terminal device and moving the robot cleaner following the terminal device according to a communication result with the terminal device.

13. A method of retrieving a container, comprising:
    returning a robot cleaner on which a container is mounted to a position guide device installed at a refrigerator;
    mounting the robot cleaner on the position guide device; and
    retrieving and storing, by the refrigerator, the container mounted on the robot cleaner.

14. The method of claim 13, further comprising:
    forward moving the robot cleaner mounted on the position guide device;
    automatically opening a door of the refrigerator; and
    backward moving the robot cleaner corresponding to a forward movement distance and remounting of the robot cleaner on the position guide device.

15. The method of claim 14, further comprising moving the position guide device stored in the refrigerator to be exposed outside the refrigerator.

16. A container transfer system comprising:
    a robot cleaner;
    a position guide device provided to allow the robot cleaner to be mounted thereon; and
    a refrigerator that mounts a container stored therein on the robot cleaner when the robot cleaner is mounted on the position guide device,
    wherein the position guide device moves from a bottom end of the refrigerator to be stored in the refrigerator or to be exposed outside the refrigerator.

17. The container transfer system of claim 16, wherein the refrigerator comprises a position guide device transferer that is provided at a bottom end portion of the refrigerator and transfers the position guide device forward or backward.

18. The container transfer system of claim 17, wherein the position guide device transferer comprises a rack, a rotor that moves along the rack, and a position guide device driver that generates a driving force with respect to the rotor.

19. The container transfer system of claim 16, wherein the refrigerator comprises a container mounter on or from which the container is mounted or separated and a container transferer that transfers the container mounter.

20. The container transfer system of claim 16, further comprising a terminal device that transmits at least one of a container transfer command and a container retrieval command to at least one of the robot cleaner, the position guide device, and the refrigerator.

* * * * *